(12) United States Patent
Belleschi et al.

(10) Patent No.: US 11,729,755 B2
(45) Date of Patent: Aug. 15, 2023

(54) MAC-PHY MODEL FOR SIDELINK CARRIER (RE)SELECTION

(71) Applicant: Telefonaktiebolaget LM Ericsson (publ), Stockholm (SE)

(72) Inventors: Marco Belleschi, Solna (SE); Shehzad Ali Ashraf, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 134 days.

(21) Appl. No.: 17/044,944

(22) PCT Filed: Apr. 4, 2019

(86) PCT No.: PCT/EP2019/058520
§ 371 (c)(1),
(2) Date: Oct. 2, 2020

(87) PCT Pub. No.: WO2019/193100
PCT Pub. Date: Oct. 10, 2019

(65) Prior Publication Data
US 2021/0176751 A1    Jun. 10, 2021

Related U.S. Application Data

(60) Provisional application No. 62/653,370, filed on Apr. 5, 2018.

(51) Int. Cl.
*H04L 1/1812* (2023.01)
*H04W 72/0453* (2023.01)
*H04W 72/23* (2023.01)

(52) U.S. Cl.
CPC ....... *H04W 72/0453* (2013.01); *H04L 1/1812* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,044,651 B2* | 6/2021 | Hong | H04L 5/0098 |
| 2019/0215685 A1* | 7/2019 | Wang | H04W 72/02 |
| 2019/0239178 A1* | 8/2019 | Shilov | H04W 56/002 |
| 2020/0084659 A1* | 3/2020 | Pan | H04W 76/15 |
| 2020/0245327 A1* | 7/2020 | Tang | G06F 9/445 |
| 2020/0383094 A1* | 12/2020 | Chae | H04L 1/1893 |

OTHER PUBLICATIONS

Catt, Discussion on Carrier Aggregation for Mode 4 in V2X Phase 2, Dec. 2017, 3GPP TSG RAN WG1 Meeting #91, R1-1720158, pp. 1-8. (Year: 2017).*

(Continued)

*Primary Examiner* — Nicholas Sloms
(74) *Attorney, Agent, or Firm* — Sage Patent Group

(57) ABSTRACT

A method in a communication device having a plurality of protocol layers including a media access control, MAC, layer and a physical, PHY, layer, includes, at the MAC layer, selecting a plurality of carriers for carrier aggregation, each of the carriers being associated to a respective hybrid automatic repeat request, HARQ, entity, and at the MAC layer, initiating a sidelink carrier reselection process by the first communication device in response to a triggering event. Related devices and computer program products are disclosed.

9 Claims, 16 Drawing Sheets

(56) References Cited

OTHER PUBLICATIONS

Huawei et al., Analysis on Resource Allocation for Pc5 CA, Dec. 2017, 3GPP TSG RAN WG2 Meeting #100, R2-1712752, pp. 1-3. (Year: 2017).*
Huawei, et al., 3GPP TSG-RAN2 Meeting 101, R2-1801906 (Revision of R2-1712752), "Considerations on resource allocation for PC5 CA," Athens, Greece, Feb. 26-Mar. 2, 2018, 5 pages.
Notice of Reasons for Rejection, Japanese Patent Application No. 2020-554190, dated Jan. 25, 2022, 5 pages.
International Search Report and Written Opinion of the International Searching Authority, PCT/EP2019/058520, dated May 27, 2019, 15 pages.
International Preliminary Report on Patentability of the International Preliminary Examining Authority, PCT/EP2019/058520, dated Apr. 6, 2020, 28 pages.
Huawei et al., 3GPP TSG-RAN WG2 Meeting #100, R2-1712750, "Reconsideration on sidelink HARQ and sidelink process in PC5 CA," Reno, USA, Nov. 27-Dec. 1, 2017, 15 pages.
Catt, 3GPP TSG-RAN WG2 Meeting #99, R2-1708062, "Discussion on Replicated Transmissions over multiple carriers," Berlin, Germany, Aug. 21-25, 2017, 5 pages.
Intel Corporation, 3GPP TSG RAN WG1 Meeting #91, R1-1720031, "Physical Layer Aspects of Sidelink Carrier Aggregaton for Mode-4 LTE V2V Communication," Reno, USA, Nov. 27-Dec. 1, 2017, 8 pages.
Samsung, 3GPP TSG-RAN WG2 Meeting #100, R2-1713841 (Resubmission of R2-1711812), "Packet Duplication for the Sidelink Carrier Aggregation," Reno, USA, Nov. 27-Dec. 1, 2017, 3 pages.
3GPP TS 36.321 v15.1.0 (Mar. 2018), $3^{rd}$ Generation Partnership Project; Technical Specification Group Radio Access Network; Evolved Universal Terrestrial Radio Access (E-UTRA); Medium Access Control (MAC) protocol specification (Release 15), 109 pages.
3GPP TS 36.213 V15.1.0 (Mar. 2018), $3^{rd}$ Generation Partnership Project; Technical Specification Group Radio Access Network; Evolved Universal Terrestrial Radio Access (E-UTRA); Physical layer procedures (Release 15), 499 pages.

* cited by examiner

RECEIVE, FROM THE PHY LAYER, AN INDICATION OF A CARRIER THAT THE MAC LAYER SHOULD NOT SELECT FOR SIMULTANEOUS TRANSMISSION IN FUTURE TTIS
602

FIGURE 6

AT THE PHY LAYER, EVALUATE WHETHER THE FIRST AND SECOND MAC PDUS CAN BE TRANSMITTED OVER THE FIRST AND SECOND CARRIERS, RESPECTIVELY, WITHIN THE FIRST TTI
702

GENERATE THE ACKNOWLEDGEMENT INDICATING WHETHER OR NOT THE SIMULTANEOUS TRANSMISSION OF THE FIRST AND SECOND MAC PDUS ON THE SELECTED FIRST AND SECOND CARRIERS WAS PERFORMED SUCCESSFULLY BASED AT LEAST IN PART ON THE EVALUATION
704

FIGURE 7

AT A MEDIA ACCESS CONTROL (MAC) LAYER, SELECT A PLURALITY OF CARRIERS FOR CARRIER AGGREGATION, EACH OF THE CARRIERS BEING ASSOCIATED TO A RESPECTIVE HYBRID AUTOMATIC REPEAT REQUEST (HARQ) ENTITY
802

AT THE MAC LAYER, INITIATE A SIDELINK RESOURCE RESELECTION PROCESS BY A FIRST COMMUNICATION DEVICE IN RESPONSE TO A TRIGGERING EVENT
804

DETERMINE AN IDENTITY OF A CARRIER ASSOCIATED WITH THE TRIGGERING EVENT
806

*FIGURE 8A*

AT A MEDIA ACCESS CONTROL (MAC) LAYER, SELECT A PLURALITY OF CARRIERS FOR CARRIER AGGREGATION, EACH OF THE CARRIERS BEING ASSOCIATED TO A RESPECTIVE HYBRID AUTOMATIC REPEAT REQUEST (HARQ) ENTITY
812

AT THE MAC LAYER, INITIATE A SIDELINK CARRIER RESELECTION PROCESS BY A FIRST COMMUNICATION DEVICE IN RESPONSE TO A TRIGGERING EVENT
814

*FIGURE 8B*

MAC-PHY MODEL FOR SIDELINK CARRIER (RE)SELECTION

CROSS REFERENCE TO RELATED APPLICATIONS

This application is a 35 U.S.C. § 371 national stage application of PCT International Application No. PCT/EP2019/058520 filed on Apr. 4, 2019, which in turn claims domestic priority to U.S. Provisional Patent Application No. 62/653,370 filed on Apr. 5, 2018, the disclosures and content of which are incorporated by reference herein in their entirety.

BACKGROUND

The present disclosure relates generally to communications, and more particularly, to wireless communications and related wireless devices and network nodes.

Sidelink (SL) is a long-term evolution (LTE) feature which enables device-to-device (D2D) communication within cellular-based LTE radio access networks. For example, as illustrated in FIG. 1, SL can be used to enable the direct communication (i.e., D2D) between proximal user equipments (UEs) such that the data does not need to go through a base station (eNB). Such D2D communication can be useful in public safety and commercial communication use-cases, and to vehicle-to-everything (V2X) scenarios. V2X communication is a type of communication which typically includes any combination of direct communication between vehicles, pedestrians, and infrastructure. V2X communication may use a network infrastructure, when available, but may also be used where lack of coverage is an issue. V2X communications may carry both non-safety and safety information, where each of the applications and services may be associated with specific requirements sets, such as requirements regarding latency, reliability, and capacity.

The European Telecommunications Standards Institute (ETSI) has defined two types of messages for road safety: (1) Co-operative Awareness Message (CAM), and (2) Decentralized Environmental Notification Message (DENM). CAM messages are intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is typically indicatively checked approximately every 100 milliseconds (ms), yielding a maximum detection latency requirement of less than or equal to 100 ms for most messages. However, the latency requirement for pre-crash sensing warning is 50 ms. DENM messages are event-triggered messages, which are triggered by events such as by braking, and the availability of a DENM message is also typically checked approximately every 100 ms. For DENM messages, the requirement of maximum latency is less than or equal to 100 ms. The package size of CAM and DENM message typically varies from greater than 100 bytes to greater than 800 bytes, with a typical size around 300 bytes. In this regard, the message is supposed to be detected by all vehicles in proximity.

The Society of Automotive Engineers (SAE) has also defined the Basic Safety Message (BSM) for DSRC (Distributed Short Range Communications) with various defined messages sizes. According to the importance and urgency of a message, the BSM further classifies such messages into different priorities.

SUMMARY

Some embodiments provide a method in a first communication device having a plurality of protocol layers including a media access control, MAC, layer and a physical, PHY, layer, includes receiving, at the MAC layer, data for transmission over a sidelink interface to a second communication device, generating, at the MAC layer, first and second MAC protocol data units, PDUs, from the data, providing the first and second MAC PDUs from the MAC layer to the PHY layer for transmission in a first transmission time interval, TTI, along with an indication of selected first and second carriers from a set of available carriers that the PHY layer should use for transmission of the first and second MAC PDUs in a sidelink transmission to the second communication device, respectively, and receiving, at the MAC layer, an acknowledgement from the PHY layer, the acknowledgement indicating whether or not the transmission of the first and second MAC PDUs on the selected first and second carriers was performed successfully.

Some further embodiments provide a method in a communication device having a plurality of protocol layers including a media access control, MAC, layer and a physical, PHY, layer, includes at the MAC layer, selecting a plurality of carriers for carrier aggregation, each of the carriers being associated to a respective hybrid automatic repeat request, HARQ, entity, at the MAC layer, initiating a sidelink resource reselection process by the first communication device in response to a triggering event, and determining an identity of a carrier associated with the triggering event, wherein initiating the sidelink resource reselection process is performed only for the carrier and associated HARQ event associated with the triggering event.

Related wireless communications devices are also disclosed.

Systems/methods according to some embodiments provide cross-layer signaling between MAC and PHY layers in a V2X device that enhance carrier reselection for sidelink carriers, and in particular, enhance the selection of carriers on which MAC PDUs can be delivered simultaneously on a sidelink.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 5-7, 8A, 8B and 9 are flowcharts illustrating operations of systems/methods according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
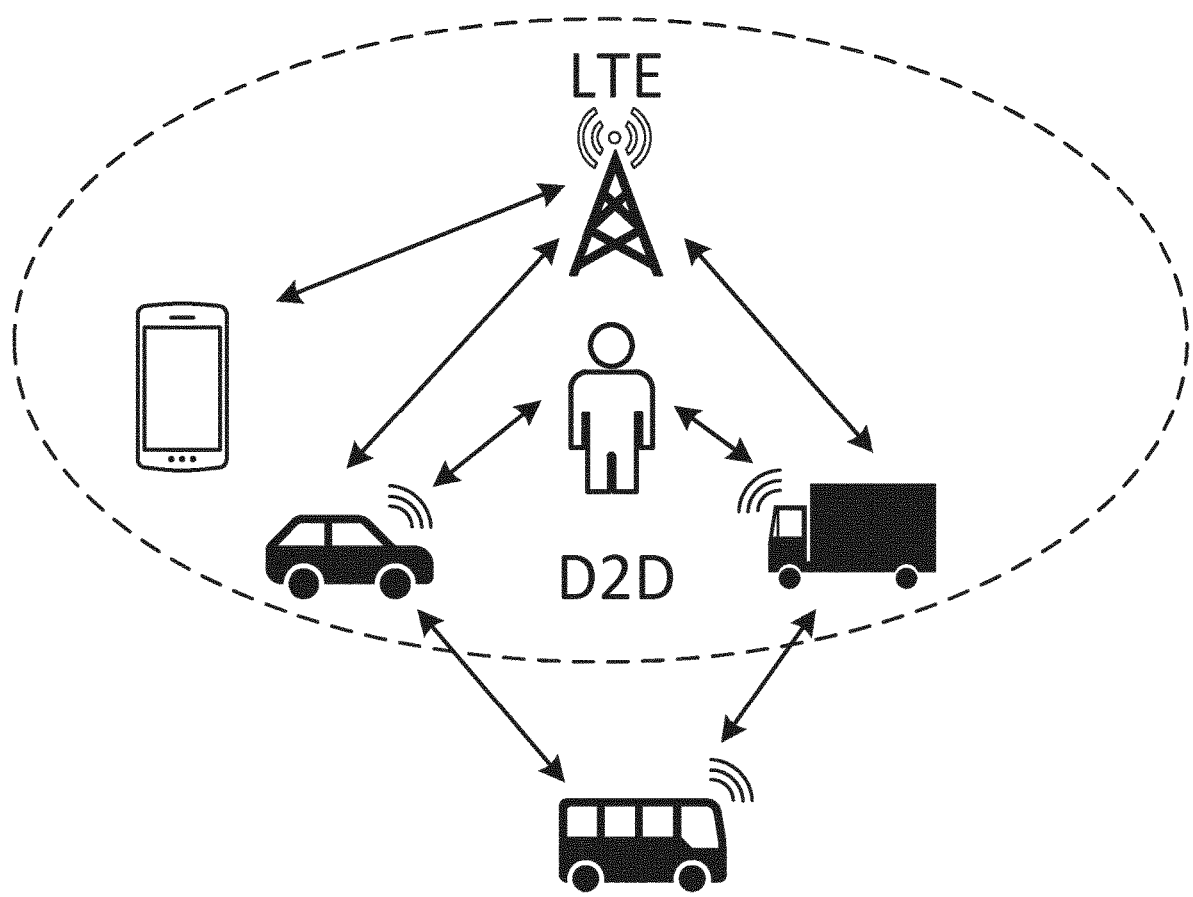
FIG. 1 is a diagram illustrating a wireless device UE according to some embodiments of inventive concepts, wherein vehicle-to-everything and device-to-device communications are illustrated in a communications network.
Figure 2:
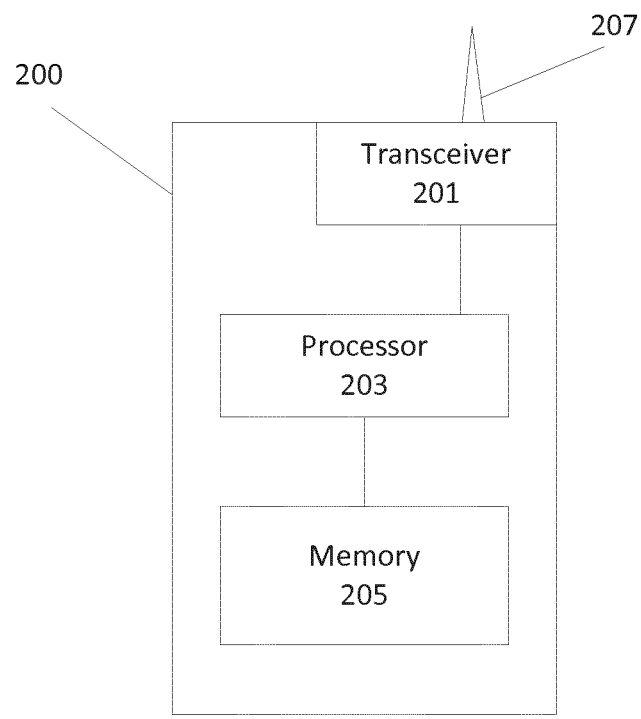
FIG. 2 is a block diagram illustrating a wireless device UE according to some embodiments of inventive concepts.

FIG. 2 is a block diagram illustrating elements of a wireless device user equipment (200) (also referred to as a wireless terminal, a wireless communication device, a wireless communication terminal, user equipment, UE, a user equipment node/terminal/device, etc.) configured to provide wireless communication according to embodiments of inventive concepts. As shown, wireless device 200 may include an antenna 207, and a transceiver circuit 201 (also referred to as a transceiver) including a transmitter and a receiver configured to provide uplink and downlink radio communications with a base station eNB of a wireless communication network (also referred to as a radio access network (RAN)). Wireless device 200 may also include a processor circuit 203 (also referred to as a processor) coupled to the transceiver circuit, and a memory circuit 205 (also referred to as memory) coupled to the processor circuit.

The memory circuit 205 may include computer readable program code that when executed by the processor circuit 203 causes the processor circuit to perform operations according to embodiments disclosed herein. According to other embodiments, processor circuit 203 may be defined to include memory so that a separate memory circuit is not required. Wireless device 200 may also include an interface (such as a user interface) coupled with processor 03, and/or wireless device 200 may be an IoT and/or MTC device.

As discussed herein, operations of wireless device 200 may be performed by processor 203 and/or transceiver 201. For example, processor 203 may control transceiver 201 to transmit uplink communications through transceiver 201 over a radio interface to a base station eNB of a wireless communication network and/or to receive downlink communications through transceiver 201 from a base station eNB of the wireless communication network over a radio interface. Moreover, modules may be stored in memory 205, and these modules may provide instructions so that when instructions of a module are executed by processor 203, processor 203 performs respective operations (e.g., operations discussed below with respect to Example Embodiments).

Figure 3:
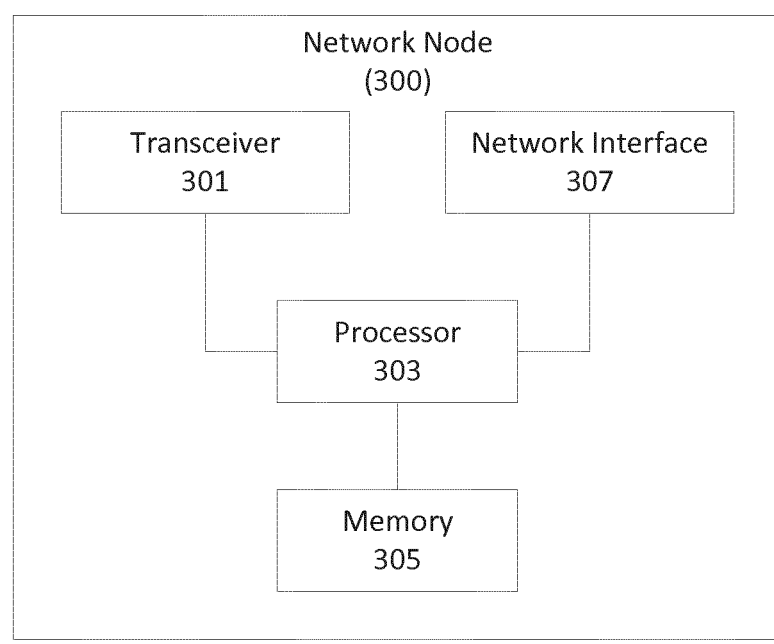
FIG. 3 is a block diagram illustrating a network node eNB according to some embodiments of inventive concepts.

FIG. 3 is a block diagram illustrating elements of a node 300 (also referred to as a network node, base station, eNB, eNodeB, gNB, gNodeB, etc.) of a wireless communication network (also referred to as a Radio Access Network RAN) configured to provide cellular communication according to embodiments of inventive concepts. As shown, the network node may include a transceiver circuit 301 (also referred to as a transceiver) including a transmitter and a receiver configured to provide uplink and downlink radio communications with wireless devices. The network node 300 may include a network interface circuit 307 (also referred to as a network interface) configured to provide communications with other nodes (e.g., with other base stations and/or core network nodes) of the RAN. The network node 300 may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein. According to other embodiments, processor circuit 303 may be defined to include memory so that a separate memory circuit is not required.

As discussed herein, operations of the network node 300 may be performed by processor 303, network interface 307, and/or transceiver 301. For example, processor 303 may control transceiver 301 to transmit downlink communications through transceiver 301 over a radio interface to one or more UEs and/or to receive uplink communications through transceiver 301 from one or more UEs over a radio interface. Similarly, processor 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processor 303, processor 303 performs respective operations (e.g., operations discussed below with respect to Example Embodiments).

Figure 4:
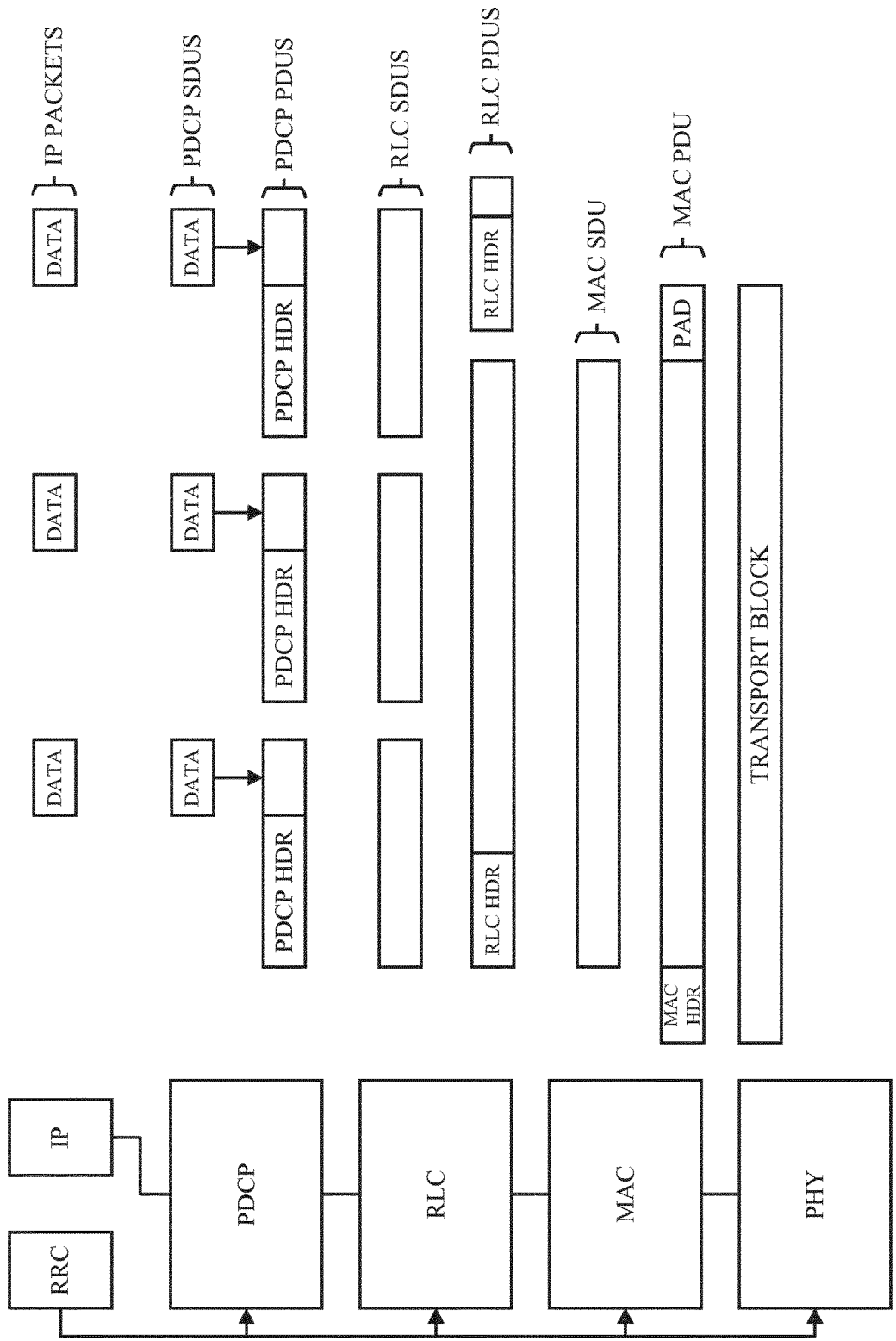
FIG. 4 is a block diagram illustrating E-UTRAN protocol layers.

The Evolved Universal Terrestrial Radio Access Network (E-UTRAN) is the radio access network architecture defined for the E-UTRA radio interface as a part of the 3GPP LTE physical layer specification. In the E-UTRA, data flows and is altered across various protocol layers. In this regard, FIG. 4 illustrates an example of a logical diagram of E-UTRAN protocol layers. As illustrated in FIG. 4, data in the form of IP packets are routed from the IP layer to the packet data convergence protocol (PDCP) layer. At the PDCP layer, the data packets are referred to as PDCP service data units (SDUs). At the PDCP layer, the PDCP SDUs are altered using header compression and a PDCP header (PDCP HDR) is appended thereon, thereby forming PDCP protocol data units (PDUs). Once the PDCP PDUs are formed, they are transferred to the radio link control (RLC) layer as RLC SDUs. The RLC SDUs are segmented to become RLC PDU, and an RLC header is appended thereon. The RLC PDUs are sent to the media access control (MAC) layer so that a MAC header (MAC HDR) and padding (PAD) can be appended as illustrated in FIG. 4, thereby forming a MAC PDU. Once formed, the MAC PDU is sent to the physical (PHY) layer, where it is referred to as a transport block (TB). The transport block in this layer is thereafter set to be transmitted over physical channels to other UEs, for example. In this manner, as one non-limiting example, vehicle-to-everything (V2X) communications can be provided.

In providing such communications, an LTE-based V2X interface may be advantageous because of the economies of scale associated with LTE. Further, providing an LTE-based V2X interface may be advantageous because it may enable enhanced integration between communications with the network infrastructure, vehicle-to-infrastructure (V2I) communications, vehicle-to-pedestrian (V2P) communications, and vehicle-to-vehicle (V2V) communications, as compared to using a dedicated V2X technology.

Modes of operation (sometimes referred to as transmission modes or resource allocation modes) for V2X UEs include Mode 3 and Mode 4. Mode 4 is also referred to as the autonomous mode because the UE typically can make decisions related to transmission on its own. Generally, in Mode 4, the UE selects the time-frequency resources to use for transmission from a large set of resources configured by the network or preconfigured in the UE. In other words, the UE performs autonomous resource allocation (also referred to as distributed resource allocation).

Autonomous resource allocation in Mode 4 typically makes combined use of two features: semi-persistent transmission and sensing-based resource allocation. Semi-persistent transmission exploits the fact that typical safety V2X traffic is approximately periodic (i.e., new packets are generated at regular intervals). Since packet arrivals are periodic, a transmitting UE can notify other UEs about its intention to use certain time-frequency resources for future transmissions. Whereas, sensing consists of monitoring the radio channel to learn about the presence of such semi-persistent transmissions. In this way, UEs can avoid collisions when selecting their resources for their own transmissions. This is also referred to as sensing-based resource allocation.

Mode 4 semi-persistent scheduling (SPS) is also known as resource reservation or resource booking, since it involves a set of time/frequency resources potentially reserved for future transmissions. Depending on the actual usage of such resources, resource reselection may be triggered to avoid excessive resource consumption. Other triggering criteria instead imply that resource reselection is triggered due to the fact that the actual MAC PDU to transmit is not tailored for the time/frequency grant previously reserved. For example, if a grant is too small or a grant is coming too late in time with respect to the packet delay budget of a MAC PDU.

Such resource reselection triggering criteria are conventionally specified in MAC layer. In conventional specifications, seven different criteria are typically used. Under the first criterion, resource reselection is triggered if SL_RESOURCE_RESELECTION_COUNTER=0 and, when SL_RESOURCE_RESELECTION_COUNTER was equal to 1, the MAC entity randomly selected, with equal probability, a value in the interval [0, 1], which is above the probability configured by upper layers in probResourceKeep. Under the second criterion, resource reselection is triggered if neither transmission nor retransmission has been performed by the MAC entity on any resource indicated in the configured sidelink grant during the last second. Under the third criterion, resource reselection is triggered if sl-ReselectAfter is configured and the number of consecutive unused transmission opportunities on resources indicated in the configured sidelink grant is equal to sl-ReselectAfter. Under the fourth criterion, resource reselection is triggered if there is no configured sidelink grant. Under the fifth criterion, resource reselection is triggered if the configured sidelink grant cannot accommodate an RLC SDU by using the maximum allowed MCS configured by upper layers in maxMCS-PSSCH and the MAC entity selects not to segment the RLC SDU. Under the sixth criterion, resource reselection is triggered if transmission(s) with the configured sidelink grant cannot fulfil the latency requirement of the data in a sidelink logical channel according to the associated PPPP, and the MAC entity selects not to perform transmission(s) corresponding to a single MAC PDU. Under the seventh criterion, resource reselection is triggered if a pool of resources is configured or reconfigured by upper layers.

With regard to sensing-based resource allocation, sensing-based resource allocation in the LTE specification generally consists of two different parts. The first part is sensing channel resources. The procedure in TS 36.213 of the 3GPP specification describes how a UE is expected to sense the channel during a certain period of time (1 second) and use received signals to predict the future utilization of the radio resources. Based on this predicted utilization, the UE creates a list of radio resources (i.e., time-frequency resources) that may be selected for transmission. This list is typically a subset of all the radio resources; that is, some resources are excluded as candidates for selection (e.g., because the UE predicts that they will be used by another UE). The second part is resource allocation. The procedure in TS 36.321 describes how the UE selects the resources it needs for transmission from the list of candidate resources provided by sensing.

Enhancements to conventional LTE V2X functionalities may be desirable. One such desirable functionality involves carrier aggregation (CA), which consists of performing simultaneous transmissions over multiple carriers. By using CA, it is possible to transmit larger packets, achieve larger transmission rates (in bits per second), and/or increase the reliability of the system (e.g., by transmitting the same packet over multiple carriers). The transmissions over multiple carriers may take place at the same time or at different times (usually separated by a few milliseconds).

To support carrier aggregation, particular UE mechanisms to select the different SL carriers may be useful. Different criteria can be used, such as the congestion of the carriers, the amount of data that a UE wants to deliver, the UE capabilities, power consumptions, and RF requirements. In this regard, which carrier(s) to select is therefore a decision that can involve information that is available at the MAC layer (such as the volume of data to transmit), and physical layer aspects (such as the UE capabilities and the power budget available).

When sidelink carrier (re)selection is triggered at the MAC layer, the MAC layer may not be aware of whether the carrier(s) selected can actually be used by physical layer for transmission. The MAC may select a certain set of carriers on the basis of MAC-related criteria, such as volume of data to transmit and/or on the basis of whether resource reselection is triggered.

In this regard, none of the above conditions take into account potential limitations at physical layer, so that once MAC PDUs are selected for simultaneous transmissions on different sidelink carriers, it may happen the physical layer (PHY) of the UE is not able to deliver all of the MAC PDUs because of limited transmission (TX) capabilities, RF requirements, power spectral density (PSD) imbalance across carriers, and/or power budget limitations.

Additionally, from the above conditions, it can be unclear whether the above resource reselection criteria should trigger carrier reselection for all carriers (which are currently in use for V2X SL communications) or only for some of those carriers or for none of the carriers.

In this regard, in some embodiments disclosed herein, methods to model MAC-PHY interaction (i.e. cross-layer signaling) for TX carrier(s) (re)selection and to describe the MAC behavior on how and on which carrier(s) to perform carrier(s) (re)selection and/or when resource (re)selection is triggered are disclosed. In this manner a MAC-PHY UE model to select a set of carriers on which MAC PDUs can be delivered simultaneously is provided.

In embodiments disclosed herein, the terminology MAC PDU and transport block (TB) are used interchangeably to indicate a transport block, selected by the MAC layer (i.e. a MAC PDU) for transmission to the physical layer. The term "same TTI" and/or "simultaneous transmission" used in the description below refers to time intervals or transmissions that are fully aligned/overlapping in time, but also to refer cases in which the transmissions of MAC PDUs on different carriers are not fully aligned in time, but for example, are within a predetermined time window, such as within a time window that a UE would need to retune/re-sync from one carrier to another. For example, assume PDU 1 is transmitted on carrier 1 during TTI1 and PDU 2 is transmitted on carrier 2 in TTI2, where TTI2 is adjacent to TTI1. Such a situation may be considered "simultaneous transmission" for purposes of the present discussion. To generalize, it could be said that if at time T1 the UE transmits in carrier 1, such UE cannot transmit in carrier 2 at time T2 wherein (T2-T1)<time threshold, where the time threshold is defined as the time the UE needs to retune/re-sync to carrier 2, then transmissions at T2 and T1 are said to be simultaneous transmissions.

In one embodiment, the MAC layer selects a certain set of carriers "A" for transmissions to lower layers, i.e. it prepares one MAC PDU for each carrier selected for transmissions on the same TTI. The HARQ entity associated to each carrier delivers the MAC PDU to the physical layer (PHY) for transmissions on the corresponding carrier.

Upon receiving MAC PDUs, i.e. TBs, for transmission on the different carriers, the physical layer evaluates whether such MAC PDUs can be transmitted in the same TTI on the selected carriers. The decision regarding whether to transmit on the carrier(s) or not can depend on the following:
whether PHY is capable of transmitting on the selected carriers simultaneously (for example, if the given carrier combination is not supported);
whether the power budget for transmissions on such carriers is not overwhelmed;
whether the transmissions on multiple carriers simultaneously lead to power spectral density (PSD) imbalance;
whether there is no other strong interfering node detected on the same carrier (for example, upon sensing or upon exemplary listen before talk (LBT) procedures, or feedback from neighboring UEs on the presence of potential interferers);
whether some carriers are too busy to receive SL data, or are monitoring Uu transmissions;
whether some carriers are too busy to receive/monitor Uu data or transmit Uu data; and/or
whether PHY is capable of transmitting due to limitation on TX switching time.

In some embodiments, PHY selects all carriers of the set A indicated by the MAC layer for transmission on the radio interface. In some embodiments, PHY only selects a subset of carriers belonging to set A for transmission. In some embodiments, PHY does not perform transmission on any carrier of set A.

In some embodiments, depending on whether all carriers of the set A are effectively used for transmission of the corresponding TBs, or only a subset or none, PHY sends feedback to MAC indicating the outcome of the transmission. The outcome can be a PHY ACK in case all TBs have been used, NACK in case none of the TBs has been transmitted, or an array of PHY feedbacks indicating for each carrier/TB whether the corresponding TB has been transmitted or not (ACK/NACK).

In some embodiments where one or more TBs have not been transmitted by the PHY, PHY may also indicate the reason why TB transmission(s) failed. For example, PHY may indicate the set of carriers, and associated time/frequency resources which MAC should not select for simultaneous transmission in a certain time window, or in the next number of TT's or never in time. In some embodiments, additional information is provided by PHY to restrict the use of certain carrier(s). For instance, if PHY sees that it cannot support a certain carrier combination or TX switching times or power allocation are too restrictive to provide good system performance.

In some embodiments, the following actions may be taken by MAC for the TB transmissions for which PHY feedback was NACK at time T1.

The MAC can exclude for simultaneous transmission on different carriers some MAC PDUs that were not transmitted at a time T1, as per PHY indication. For example, if PHY indicated that a first transport block TB1 in carrier 1 and a second transport block TB2 in carrier 2 can be transmitted simultaneously but not a third transport block TB3 in carrier 3, MAC can select in one of the next TTI at a time T2 greater than or equal to time T1, resources to transmit TB1 and TB2, while TB3 is postponed for transmission at time T3 and carrier 3 is not selected for transmission at time T2. In some embodiments, TB3 is postponed for transmission based on the latency requirements (which can be acquired using PPPP associated to the TB).

Additional actions in some embodiments also include MAC triggering carrier reselection and/or resource reselection for transmission of such TBs, by either performing resource reservation of a new set(s) of time-frequency resources in the same or different carriers than the one or more previously selected (i.e., configuring a new SL grant), or by performing transmission of a TB without reserving resources. For example, MAC may select again TB1 and TB2 for transmission on carrier 1 and carrier 2 respectively for transmission at time T2, and it may select another carrier (different from carrier 3) for transmission of TB3 still at time T2. Or in another alternative only resource reselection is triggered (i.e., MAC just selects another set of time/frequency resources for simultaneous transmission of TB1/TB2/TB3 in different carriers, but still keep carriers 1/2/3 for transmission (i.e. it does not perform carrier reselection)).

In other embodiments, actions include, in case PHY only provides ACK/NACK for the MAC PDUs previously scheduled by MAC, with no additional indication, MAC performing either carrier reselection for the carriers in which MAC PDUs could not be transmitted by PHY, and/or performing resource reselection on the basis of resource availability indicated by PHY which can also be acquired upon sensing (i.e. before MAC delivered to PHY the concerned MAC PDUs at time T1). MAC may not take into account the reasons for which MAC PDUs were not transmitted at time T1, in case PHY did not provide such indication to MAC.

In other embodiments, MAC can put back in the RLC buffer the TBs that were not transmitted at time T1, in case those TBs correspond to initial transmission (i.e. not retransmission). Depending on when MAC decides to select a transmitting grant and the size of the selected grant, segmentation/concatenation and logical channel prioritization can be performed again in some embodiments.

In other embodiments, MAC can store the information that a certain carrier combination and/or the time-frequency resources for which transmission was not successful at time T1, so that the same combination will not be used again in a later occasion.

In other embodiments, MAC may not step transmission counters related to the TBs that were not transmitted. For instance, MAC may not step the retransmission counter, the CURRENT_IRV counter that steps the RVI in physical layer, and/or the SL_RESOURCE_RESELECTION_COUNTER which counts the usage of reserved time/frequency resources. In another embodiment, the SL_RESOURCE_RESELECTION_COUNTER is stepped considering that the UE tries to transmit. Similarly, the sl-ReselectAfter counter may not be stepped since the UE, in some embodiments, did try to transmit on a certain resource though it did not manage.

According to some embodiments, the PHY layer may also indicate whether the unsuccessful transmission is of transmission or retransmissions (i.e. 1st or 2nd transmission of same TB). If a TB corresponding to retransmission is unsuccessful, then MAC can choose to just drop the transmission instead of performing the above-mentioned procedures. Furthermore, MAC can apply some further limitations while again scheduling the drop TB corresponding to retransmissions. For instance, in some embodiments, MAC may not select a different carrier than its original transmission. In some embodiments, extra signaling is performed to assist the Rx UE which indicates/refers to the original transmission if time/frequency resources are only reselected for retransmissions.

The above procedure(s) may be repeated until all TBs are transmitted by the physical layer. For example, in considering that either all or none of the MAC PDUs initially selected by MAC can be transmitted by PHY, MAC may try to select a different set of carriers and/or timer/frequency resources until all TBs are transmitted by PHY, in which case PHY will signal ACK.

In some embodiments, the following actions may be taken by MAC for the TB transmissions for which PHY feedback was ACK at time T1. The MAC layer can consider the packet transmitted over the air. This implies that the SL_RESOURCE_RESELECTION_COUNTER is stepped down, the CURRENT_IRV is stepped, and the retransmission counter is stepped. In additional embodiments, MAC stores the info that at time T1 a certain combination of SL carriers were successfully used for transmission.

With regard to carrier selection upon resource reselection, in some embodiments, carrier selection may be triggered for one or more carriers depending on the type of trigger for the resource reselection. For example, if the MAC entity triggers carrier reselection for all carriers whenever one triggering condition is met there might be a risk of having carrier switches occurring too frequently because some triggering condition might affect only operations in one specific HARQ entity/carrier. For example, if the carrier selection is triggered because of SL_RESOURCE_RESELECTION_COUNTER=0 for one HARQ entity/carrier, there may be no need to trigger carrier reselection for all other carriers currently in use, with reserved resources. Similarly, if there is a TX capability issue only with some of the carriers in set A, PHY may indicate that a subset B of carriers in set A can be used simultaneously, while another subset C of carriers in set A cannot be used simultaneously. In such a case, carrier reselection may be performed for those carriers in subset C. Furthermore, to increase the system performance, PHY can also indicate the restriction of the use of multiple carriers simultaneously by MAC layer.

In this regard, in some embodiments, carrier reselection may be triggered for the specific carrier/HARQ entity in which a certain event occurred. In additional embodiments, events that affect a specific carrier/HARQ entity are included, however such embodiments may not be limited by the below events:

For a specific carrier/HARQ entity, if SL_RESOURCE_RESELECTION_COUNTER=0 and, when SL_RESOURCE_RESELECTION_COUNTER was equal to 1, the MAC entity randomly selected, with equal probability, a value in the interval [0, 1] which is above the probability configured by upper layers in probResourceKeep;

if neither transmission nor retransmission has been performed by the MAC entity on any resource indicated in the configured sidelink grant during the last second for a specific carrier/HARQ entity;

if sl-ReselectAfter is configured and the number of consecutive unused transmission opportunities on resources indicated in the configured sidelink grant is equal to sl-ReselectAfter, for a specific carrier/HARQ entity;

if a pool of resources is configured or reconfigured by upper layers for a specific carrier; and/or if capability issues, power limitations or other radio problems (as the one indicated in previous section) only affect a specific carrier.

After triggering carrier reselection, the MAC entity may also perform the following actions in additional embodiments:

continue using the same sidelink carrier affected by any of the events above (and perform resource reselection on that carrier (i.e., configure a new SL grant));

select another sidelink carrier and configure another SL grant (i.e., perform resource selection) and stop using the sidelink carrier affected by any of the events above;

select multiple sidelink carriers and configure other SL grants (i.e., perform resource selection) and stop using the sidelink carriers affected by any of the events above;

stop using the sidelink carrier affected by any of the events above, and not select any other sidelink carrier; and/or perform one single transmission rather than selecting a carrier for resource reservation.

In other embodiments, carrier reselection may be triggered for more than one carrier. For example, for events that impact the UE behavior, such as the MAC entity behavior, irrespective of the specific per HARQ entity/carrier operations. Such events include, but are not limited to, those performance criteria that may not be met for none of the sidelink grants already configured in the different sidelink carriers:

if there is no configured sidelink grant in any SL carrier;

if the configured sidelink grant cannot accommodate a RLC SDU by using the maximum allowed MCS configured by upper layers in maxMCS-PSSCH for any SL carrier with configured SL grant and the MAC entity selects not to segment the RLC SDU;

if transmission(s) with the configured sidelink grant cannot fulfil the latency requirement of the data in a sidelink logical channel according to the associated PPPP for any SL carrier with configured SL grant; and the MAC entity selects not to perform transmission(s) corresponding to a single MAC PDU;

if the UE capability and/or power limitations are experienced by potential simultaneous transmissions in multiple carriers; and/or if transmissions with the configured sidelink grant are such that the UE is unable to listen/sense the carriers for a long time due to half duplex limitation. For instance, if the total transmission time of UE on all the selected carriers is more than a pre-defined threshold.

For carrier reselection triggered for the above reasons, the MAC entity may perform the following actions:

continue using the same sidelink carriers, and perform resource reselection in one carrier;

select another sidelink carrier and stop using any of the sidelink carriers with a configured sidelink grant;

select multiple other sidelink carriers and stop using any of the sidelink carriers with a configured sidelink grant;

stop using any of the sidelink carriers and not select any other sidelink carrier (i.e., just perform one shot transmission).

Figure 5:
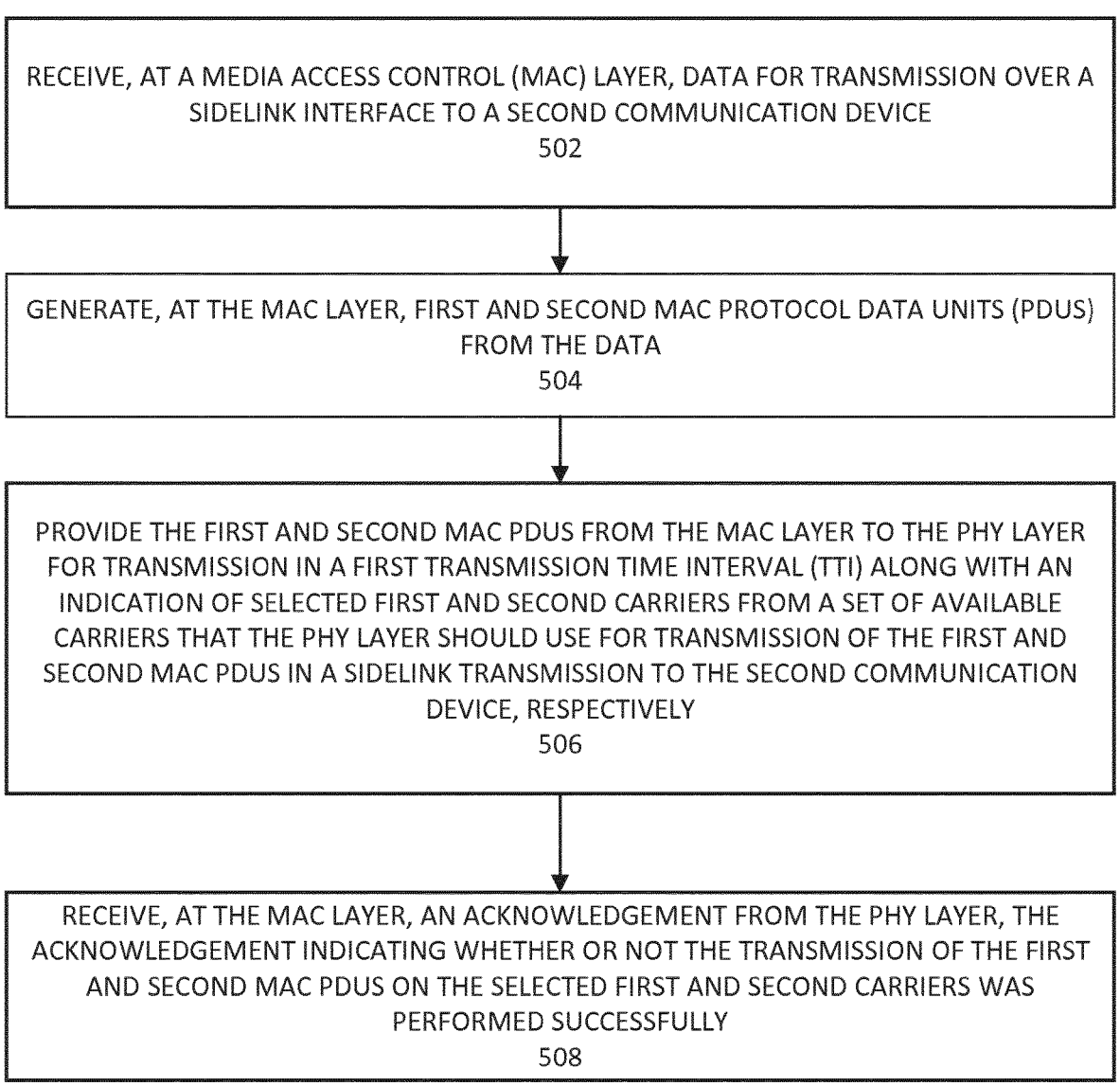

Operations of a wireless communication device, such as a UE or base station, will now be discussed with reference to the flowchart of FIG. 5 according to some embodiments of inventive concepts. For example, modules may be stored in wireless terminal memory 405 of FIG. 2, and these modules may provide instructions so that when the instructions of a module are executed by wireless device processor 4003, processor 4003 performs respective operations of the flow chart of FIG. 5. Similarly, modules may be stored in network node memory 5005 of FIG. 3, and these modules may provide instructions so that when the instructions of a module are executed by network node processor 5003, processor 4003 performs respective operations of the flow chart of FIG. 5.

According to some embodiments, a method in a first communication device having a plurality of protocol layers including a media access control, MAC, layer and a physical, PHY, layer, includes receiving (block 502), at the MAC layer, data for transmission over a sidelink interface to a second communication device. The method further includes generating (block 504) at the MAC layer, first and second MAC protocol data units, PDUs, from the data, and providing (block 506) the first and second MAC PDUs from the MAC layer to the PHY layer for simultaneous or near-simultaneous transmission in a first transmission time interval, TTI, along with an indication of selected first and second carriers from a set of available carriers that the PHY layer should use for transmission of the first and second MAC PDUs in a sidelink transmission to the second communication device, respectively. Finally, the method includes receiving (block 508), at the MAC layer, an acknowledgement from the PHY layer, the acknowledgement indicating whether or not the simultaneous transmission of the first and second MAC PDUs on the selected first and second carriers was performed successfully. The acknowledgement from the PHY layer may include a negative acknowledgement, NAK, the NAK indicating that the PHY layer was unable to transmit at least one of the first and second MAC PDUs on the respective selected carrier indicated by the MAC layer.

The acknowledgement may include an array of feedback indicators indicating whether transmission of respective MAC PDUs on the selected first and second carriers was successful.

Referring to FIG. 6, methods according to some embodiments further include receiving (block 602), from the PHY layer, an indication of a carrier that the MAC layer should not select for simultaneous transmission in future TTIs.

Methods according to some embodiments may further include, for a MAC PDU transmission for which a negative acknowledgement is received at the MAC layer, performing at least one of excluding the MAC PDU from simultaneous transmission on different carriers in subsequent TTIs, triggering carrier reselection and/or resource reselection for transmission of the MAC PDU in a subsequent TTI, returning the MAC PDU to a radio link control, RLC, buffer, storing information relating to a carrier combination and/or time/frequency resources for which the MAC PDU transmission was unsuccessful, and refraining from advancing a transmission counter relating to the MAC PDU that was not successfully transmitted. In particular, one or more MAC SDUs of the MAC PDU may be returned to the RLC buffer.

The transmission counter may include a retransmission counter, a CURRENT_IRV counter and/or a SL_RESOURCE_RESELECTION_COUNTER.

The method may further include in response to the acknowledgement indicating that the transmission of the first and second MAC PDUs on the selected first and second carriers was successful, storing information indicating that simultaneous transmission on the first and second carriers was successful.

The method may further include receiving an indication from the PHY layer that an unsuccessful transmission was a retransmission.

The method may further include in response to receiving the indication from the PHY layer that an unsuccessful transmission of a MAC PDU was a retransmission, dropping transmission of the MAC PDU.

The data received at the MAC layer for transmission includes a radio link control, RLC, layer service data unit, SDU.

Referring to FIG. 7, methods according to some embodiments may further include at the PHY layer, evaluating (block 702) whether the first and second MAC PDUs can be transmitted over the first and second carriers, respectively, within the first TTI, and generating (block 704) the acknowledgement indicating whether or not the simultaneous transmission of the first and second MAC PDUs on the selected first and second carriers was performed successfully based at least in part on the evaluation.

Evaluating whether the first and second MAC PDUs can be transmitted over the first and second carriers, respectively, within the first TTI may depend on at least one of whether the PHY is capable of transmitting on the first and second carriers simultaneously, whether a power budget for transmissions on the first and second carriers is overwhelmed, whether simultaneous transmissions on the first and second carriers may lead to power spectral density, PSD, imbalance, whether a strong interfering node is detected on the first or second carrier, whether the first or second carrier is busy to receiving sidelink data or monitoring Uu transmissions, whether the first or second carrier is busy receiving or transmitting Uu data, and whether the PHY layer is capable of transmitting on the first and second carriers due to a limitation on transmitter switching time.

Referring to FIG. 8A, a method in a communication device having a plurality of protocol layers including a media access control, MAC, layer and a physical, PHY, layer, includes at the MAC layer, selecting (802) a plurality of carriers for carrier aggregation, each of the carriers being associated to a respective hybrid automatic repeat request, HARQ, entity, at the MAC layer, initiating (804) a sidelink resource reselection process by the first communication device in response to a triggering event, and determining (806) an identity of a carrier associated with the triggering event, wherein initiating the sidelink resource reselection process is performed only for the carrier and associated HARQ event associated with the triggering event.

The method may further include, after initiating the sidelink resource reselection process, performing at least one of continuing to use a previous carrier and performing resource reselection on the previous carrier, selecting a second sidelink carrier and configuring a second sidelink grant on the second sidelink carrier, and ceasing to use the sidelink carrier and not selecting any other sidelink carrier.

Referring to FIG. 8B, in some embodiments, a method in a communication device having a plurality of protocol layers including a media access control, MAC, layer and a physical, PHY, layer, includes, at the MAC layer, selecting (block 812) a plurality of carriers for carrier aggregation, each of the carriers being associated to a respective hybrid automatic repeat request, HARQ, entity, and at the MAC layer, initiating (block 814) a sidelink carrier reselection process by the first communication device in response to a triggering event.

Initiating the sidelink carrier reselection process may be performed only for the carrier and associated HARQ event associated with the triggering event. In some embodiments, initiating the sidelink carrier reselection process is performed for all sidelink carriers configured for sidelink operations.

The method may further include, after initiating the sidelink carrier reselection process, performing at least one of: continuing to use a previous carrier and performing resource reselection on the previous carrier, selecting a second sidelink carrier (or multiple additional sidelink carriers) and configuring a second sidelink grant on the second sidelink carrier(s), and ceasing to use the sidelink carrier and not selecting any other sidelink carrier.

The triggering event may include at least one of: for a specific carrier/HARQ entity, if an SL_RESOURCE_RESELECTION_COUNTER=0 and, when the SL_RESOURCE_RESELECTION_COUNTER was equal to 1, the MAC randomly selected, with equal probability, a value in an interval [0, 1] which is above a probability configured by upper layers, neither transmission nor retransmission has been performed by MAC on any resource indicated in a configured sidelink grant during a previous second for a specific carrier/HARQ entity, sl-ReselectAfter is configured and a number of consecutive unused transmission opportunities on resources indicated in the configured sidelink grant is equal to sl-ReselectAfter, for a specific carrier/HARQ entity, and/or a pool of resources is configured or reconfigured by upper layers for a specific carrier.

In some embodiments, the triggering event may include at least one of there is no configured sidelink grant in any sidelink carrier, a configured sidelink grant cannot accommodate an RLC SDU by using a maximum allowed modulation and coding scheme, MCS, configured by upper layers for any sidelink carrier with configured SL grant and the MAC entity selects not to segment the RLC SDU, transmission(s) with a configured sidelink grant cannot fulfil a latency requirement of data in a sidelink logical channel for any sidelink carrier with a configured sidelink grant, and the MAC selects not to perform transmission(s) corresponding to a single MAC PDU, UE capability and/or power limitations are experienced by potential simultaneous transmissions in multiple carriers, and/or transmissions with a configured sidelink grant are such that the UE is unable to listen/sense the carriers for a long time due to half duplex limitation.

Figure 9:
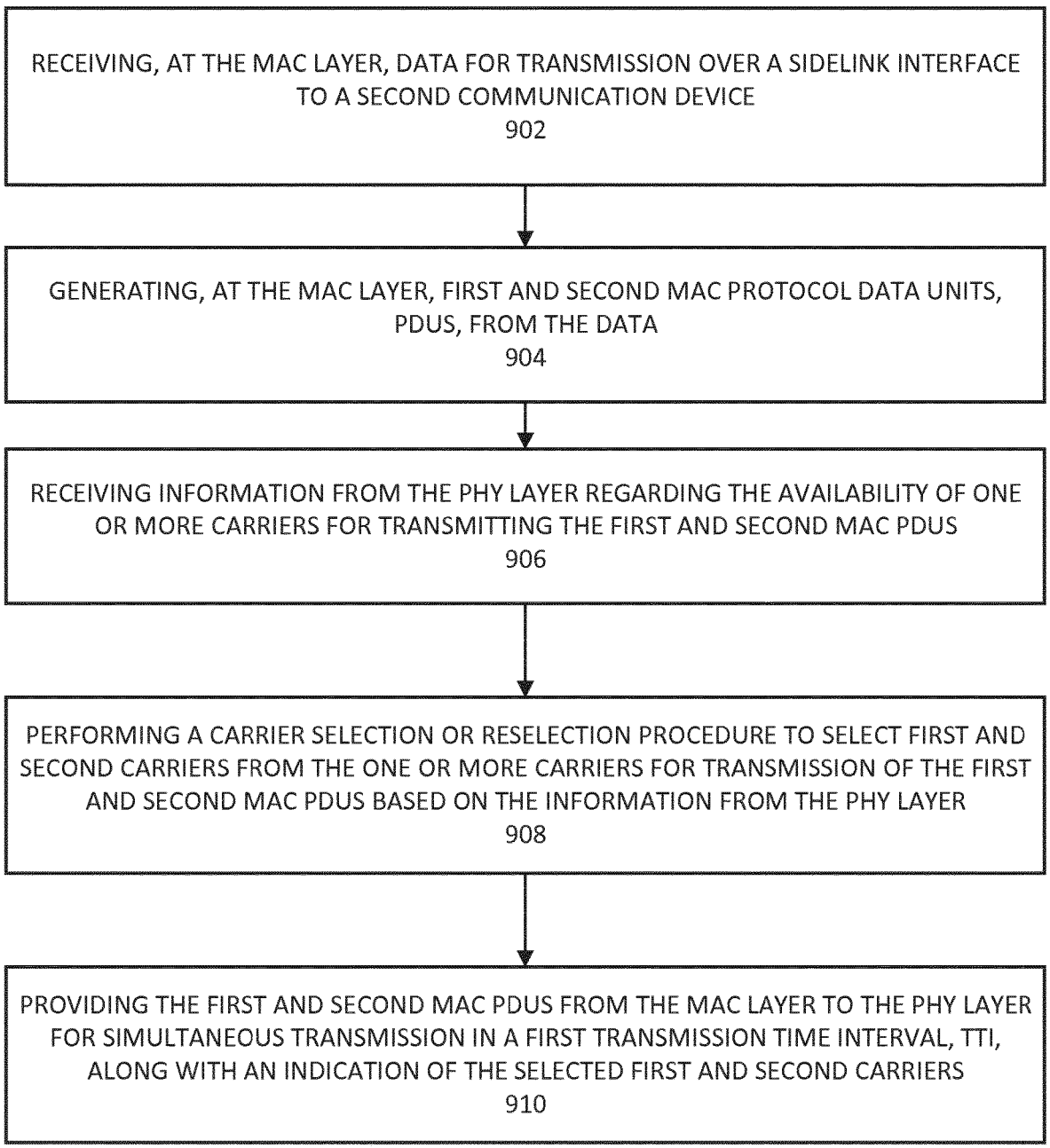

FIG. 9 illustrates a method in a first communication device having a plurality of protocol layers including a media access control, MAC, layer and a physical, PHY, layer. The method includes receiving (block 902), at the MAC layer, data for transmission over a sidelink interface to a second communication device, generating (block 904), at the MAC layer, first and second MAC protocol data units, PDUs, from the data, receiving (block 906) information from the PHY layer regarding the availability of one or more carriers for transmitting the first and second MAC PDUs, performing (block 908) a carrier selection or reselection procedure to select first and second carriers from the one or more carriers for transmission of the first and second MAC PDUs based on the information from the PHY layer, and providing (block 910) the first and second MAC PDUs from the MAC layer to the PHY layer for simultaneous transmission in a first transmission time interval, TTI, along with an indication of the selected first and second carriers.

The information from the PHY layer may include an indication of a carrier or time/frequency resources on the carrier that the MAC layer should not select for simultaneous transmission in the future.

The information from the PHY layer may include an indication of a carrier combination and/or time/frequency resources that the information from the PHY layer indicates is unavailable for transmission.

The information from the PHY layer may include an indication of a carrier combination and/or time/frequency resources that the information from the PHY layer indicates is available for transmission.

The method may further include MAC triggering carrier reselection and/or resource reselection for transmission of at least one of the first and second MAC PDUs excluding the time/frequency resources for simultaneous transmissions of MAC PDUs in different carriers as indicated by PHY, and storing information relating to a carrier combination and/or time/frequency resources that the information from the PHY layer indicates is unavailable for transmission.

In some embodiments, for example, when the available set of time/frequency resources is not sufficient to accommodate the MAC PDTU, the method may include returning one or more MAC SDUs of at least one of the first and second MAC PDUs to a radio link control, RLC, buffer.

The data received at the MAC layer for transmission may include a radio link control, RLC, layer service data unit, SDU.

The method may further include generating, at the PHY layer, an indication of whether or not simultaneous transmission of the first and second MAC PDUs on the selected first and second carriers can be performed successfully, and transmitting the indication to the MAC layer.

Evaluating whether the first and second MAC PDUs can be transmitted over the first and second carriers, respectively, within the first TTI may depend on at least one of: whether the PHY is capable of transmitting on the first and second carriers simultaneously, whether a power budget for transmissions on the first and second carriers is overwhelmed, whether simultaneous transmissions on the first and second carriers may lead to power spectral density, PSD, imbalance, whether a strong interfering node is detected on the first or second carrier, whether the first or second carrier is busy to receiving sidelink data or monitoring Uu transmissions, whether the first or second carrier is busy receiving or transmitting Uu data, and whether the PHY layer is capable of transmitting on the first and second carriers due to a limitation on transmitter switching time.

Example embodiments of inventive concepts are set forth below.

Embodiment 1. A method in a first communication device having a plurality of protocol layers including a media access control, MAC, layer and a physical, PHY, layer, the method comprising:

receiving, at the MAC layer, data for transmission over a sidelink interface to a second communication device;

generating, at the MAC layer, first and second MAC protocol data units, PDUs, from the data;

providing the first and second MAC PDUs from the MAC layer to the PHY layer for simultaneous transmission in a first transmission time interval, TTI, along with an indication of selected first and second carriers from a set of available carriers that the PHY layer should use for transmission of the first and second MAC PDUs in a sidelink transmission to the second communication device, respectively; and receiving, at the MAC layer, an acknowledgement from the PHY layer, the acknowledgement indicating whether or not the simultaneous transmission of the first and second MAC PDUs on the selected first and second carriers was performed successfully.

Embodiment 2. The method of Embodiment 1, wherein the acknowledgement from the PHY layer comprises a negative acknowledgement, NAK, the NAK indicating that the PHY layer was unable to transmit at least one of the first and second MAC PDUs on the respective selected carrier indicated by the MAC layer.

Embodiment 3. The method of Embodiment 1 or 2, wherein the acknowledgement comprises an array of feedback indicators indicating whether transmission of respective MAC PDUs on the selected first and second carriers was successful.

Embodiment 4. The method of any previous Embodiment, further comprising: receiving, from the PHY layer, an indication of a carrier that the MAC layer should not select for simultaneous transmission in future TTIs.

Embodiment 5. The method of any previous Embodiment, further comprising:

for a MAC PDU transmission for which a negative acknowledgement is received at the MAC layer, performing at least one of:

excluding the MAC PDU from simultaneous transmission on different carriers in subsequent TTIs;

triggering carrier reselection and/or resource reselection for transmission of the MAC PDU in a subsequent TTI;

returning the MAC PDU to a radio link control, RLC, buffer;

storing information relating to a carrier combination and/or time/frequency resources for which the MAC PDU transmission was unsuccessful; and refraining from advancing a transmission counter relating to the MAC PDU that was not successfully transmitted.

Embodiment 6. The method of Embodiment 5, wherein the transmission counter comprises a retransmission counter, a CURRENT_IRV counter and/or a SL_RESOURCE_RESELECTION_COUNTER.

Embodiment 7. The method of any previous Embodiment, further comprising: in response to the acknowledgement indicating that the transmission of the first and second MAC PDUs on the selected first and second carriers was successful, storing information indicating that simultaneous transmission on the first and second carriers was successful.

Embodiment 8. The method of any previous Embodiment, further comprising: receiving an indication from the PHY layer that an unsuccessful transmission was a retransmission.

Embodiment 9. The method of Embodiment 8, further comprising: in response to receiving the indication from the PHY layer that an unsuccessful transmission of a MAC PDU was a retransmission, dropping transmission of the MAC PDU.

Embodiment 10. The method of Embodiment 1, wherein the data received at the MAC layer for transmission comprises a radio link control, RLC, layer service data unit, SDU.

Embodiment 11. The method of any previous Embodiment, further comprising: at the PHY layer, evaluating whether the first and second MAC PDUs can be transmitted over the first and second carriers, respectively, within the first TTI; and generating the acknowledgement indicating whether or not the simultaneous transmission of the first and second MAC PDUs on the selected first and second carriers was performed successfully based at least in part on the evaluation.

Embodiment 12. The method of Embodiment 11, wherein evaluating whether the first and second MAC PDUs can be transmitted over the first and second carriers, respectively, within the first TTI depends on at least one of: whether the PHY is capable of transmitting on the first and second carriers simultaneously; whether a power budget for transmissions on the first and second carriers is overwhelmed; whether simultaneous transmissions on the first and second carriers may lead to power spectral density, PSD, imbalance; whether a strong interfering node is detected on the first or second carrier; whether the first or second carrier is busy to receiving sidelink data or monitoring Uu transmissions; whether the first or second carrier is busy receiving or transmitting Uu data; and whether the PHY layer is capable of transmitting on the first and second carriers due to a limitation on transmitter switching time.

Embodiment 13. A first wireless device (UE) comprising:

a transceiver (4001) configured to provide wireless network communication with a wireless communication network; and a processor (4003) coupled with the transceiver, wherein the processor is configured to provide wireless network communication through the transceiver, and wherein the processor is configured to perform operations according to any of Embodiments 1 to 12.

Embodiment 14. A wireless device (UE) wherein the wireless terminal is adapted to perform according to any of Embodiments 1 to 12.

Embodiment 15. A base station (eNB) of a wireless communication network, the base station comprising:
a transceiver (5001) configured to provide wireless network communication with a wireless terminal; and
a processor (5003) coupled with the transceiver, wherein the processor is configured to provide wireless network communications through the transceiver, and wherein the processor is configured to perform operations according to any of Embodiments 1 to 12.

Embodiment 16. A base station (eNB) of a radio access network, wherein the base station is adapted to perform according to any of Embodiments 1 to 12.

Embodiment 17. A method in a communication device having a plurality of protocol layers including a media access control, MAC, layer and a physical, PHY, layer, the method comprising:
at the MAC layer, selecting a plurality of carriers for carrier aggregation, each of the carriers being associated to a respective hybrid automatic repeat request, HARQ, entity;
at the MAC layer, initiating a sidelink resource reselection process by the first communication device in response to a triggering event; and
determining an identity of a carrier associated with the triggering event;
wherein initiating the sidelink resource reselection process is performed only for the carrier and associated HARQ event associated with the triggering event.

Embodiment 18. The method of Embodiment 17, further comprising: after initiating the sidelink resource reselection process, performing at least one of: continuing to use a previous carrier and performing resource reselection on the previous carrier; selecting a second sidelink carrier and configuring a second sidelink grant on the second sidelink carrier; and ceasing to use the sidelink carrier and not selecting any other sidelink carrier.

Embodiment 19. A first wireless device (UE) comprising:
a transceiver (4001) configured to provide wireless network communication with a wireless communication network; and
a processor (4003) coupled with the transceiver, wherein the processor is configured to provide wireless network communication through the transceiver, and wherein the processor is configured to perform operations according to any of Embodiments 17 to 18.

Embodiment 20. A wireless device (UE) wherein the wireless terminal is adapted to perform according to any of Embodiments 17 to 18.

Embodiment 21. A base station (eNB) of a wireless communication network, the base station comprising:
a transceiver (5001) configured to provide wireless network communication with a wireless terminal; and
a processor (5003) coupled with the transceiver, wherein the processor is configured to provide wireless network communications through the transceiver, and wherein the processor is configured to perform operations according to any of Embodiments 17 to 18.

Embodiment 22. A base station (eNB) of a radio access network, wherein the base station is adapted to perform according to any of Embodiments 17 to 18.

Embodiment 23. The method of Embodiment 5, wherein returning the MAC PDU to the RLC buffer comprises returning one or more MAC service data units, SDUs, of the MAC PDU to the RLC buffer.

Explanations for abbreviations from the above disclosure are provided below.

Abbreviation Explanation

CAM Collective awareness message
CBR Channel busy ratio
CR Channel ratio or occupancy ratio
DENM Decentralized environmental notification message
NW Network
PPPP ProSe Per-Packet Priority
ProSe Proximity Serives
RRC Radio Resource Control
RSRP Reference Signal Received Power
RSSI Received Signal Strength Indicator
UE User equipment
V2I Vehicle-to-infrastructure
V2P Vehicle-to-pedestrian
V2V Vehicle-to-vehicle
V2X Vehicle-to-anything
MAC Medium Access Control
PHY Physical Layer
PSD Power Spectral Density
PDU Protocol Data Unit
RLC Radio Link Control
TB Transport Block
SDU Service Data Unit
SL Sidelink
PHY Physical Layer Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
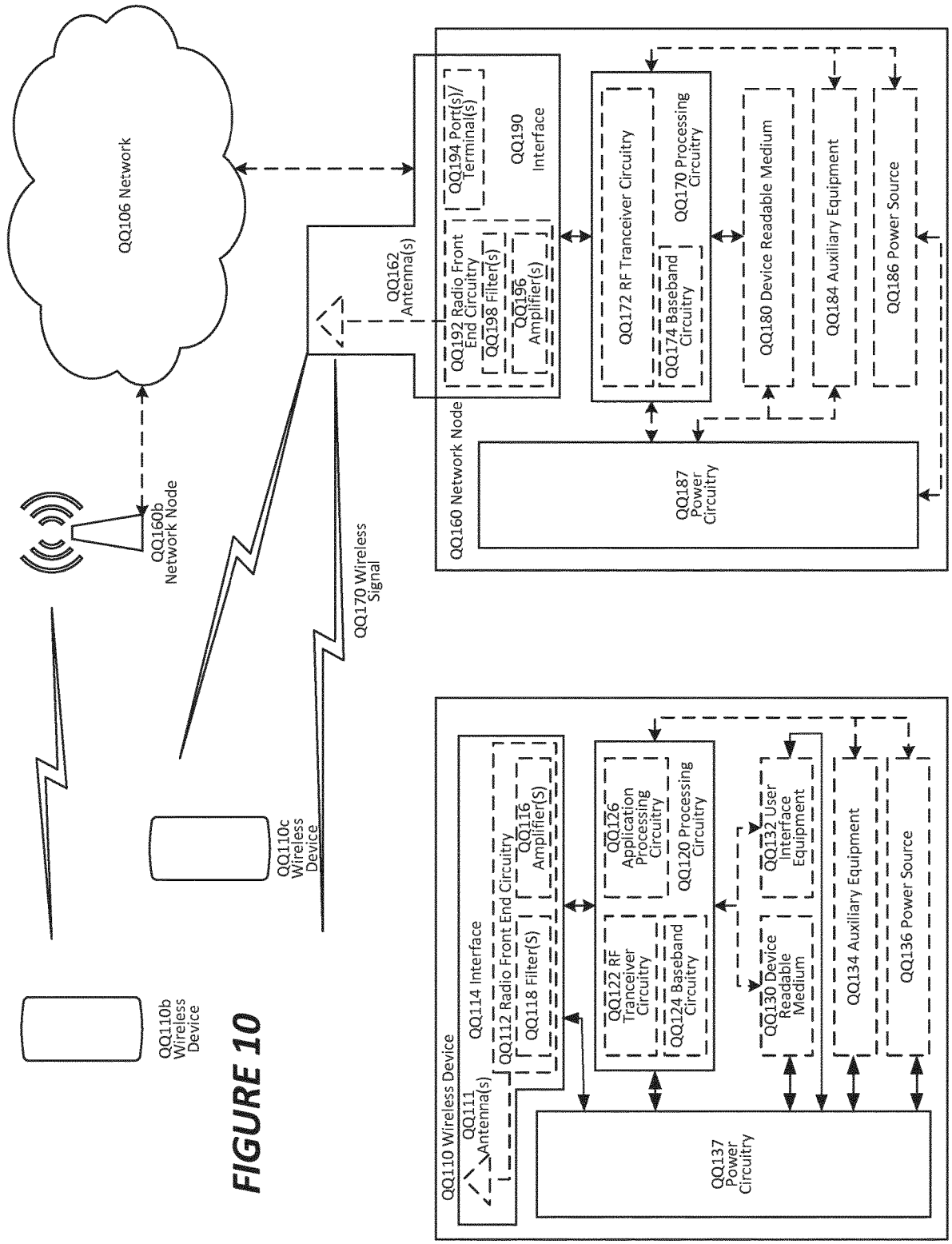
FIG. 10 is a block diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
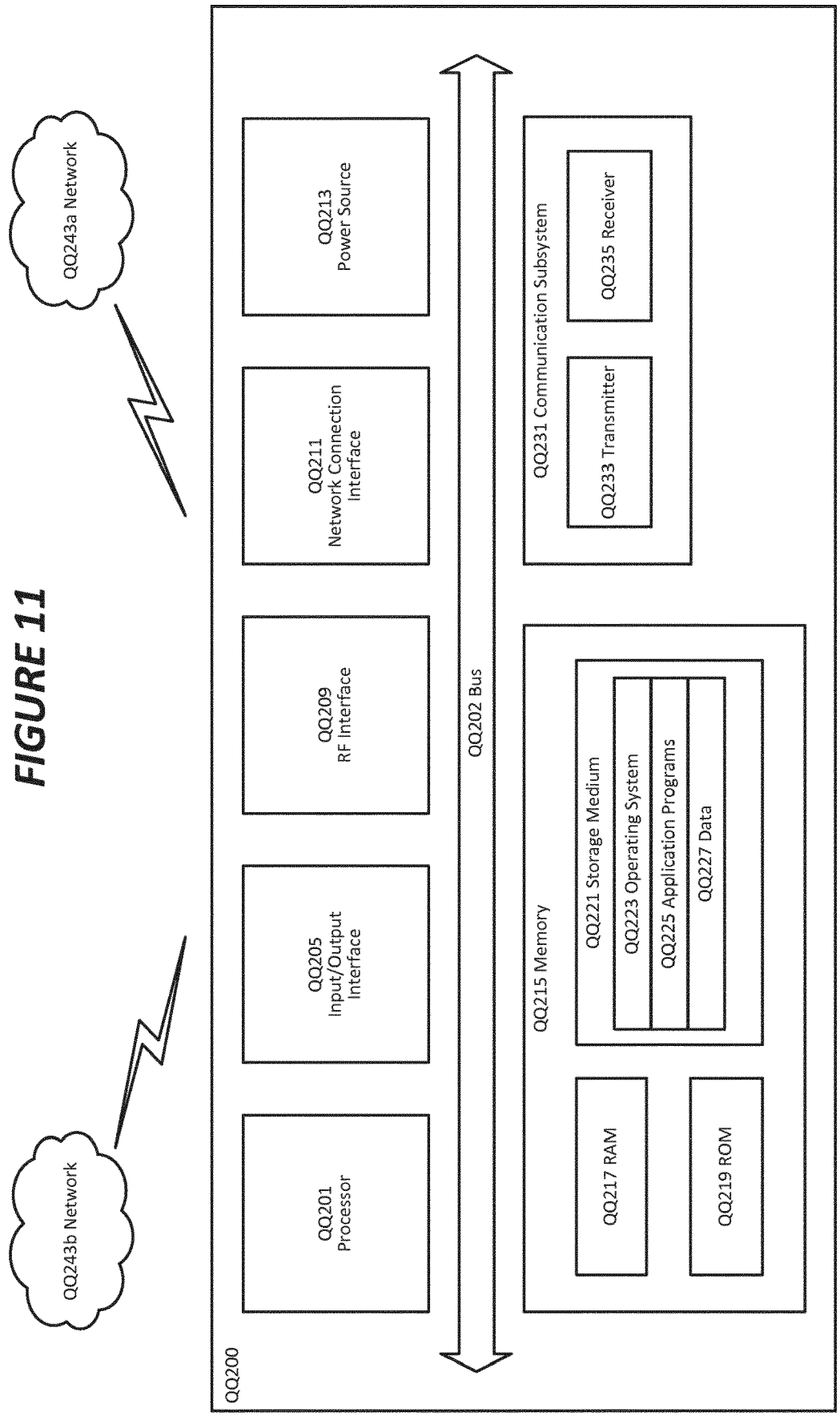
FIG. 11 is a block diagram of a user equipment in accordance with some embodiments

FIG. 11: User Equipment in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243*b* using communication subsystem QQ231. Network QQ243*a* and network QQ243*b* may be the same network or networks or different network or networks.

Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
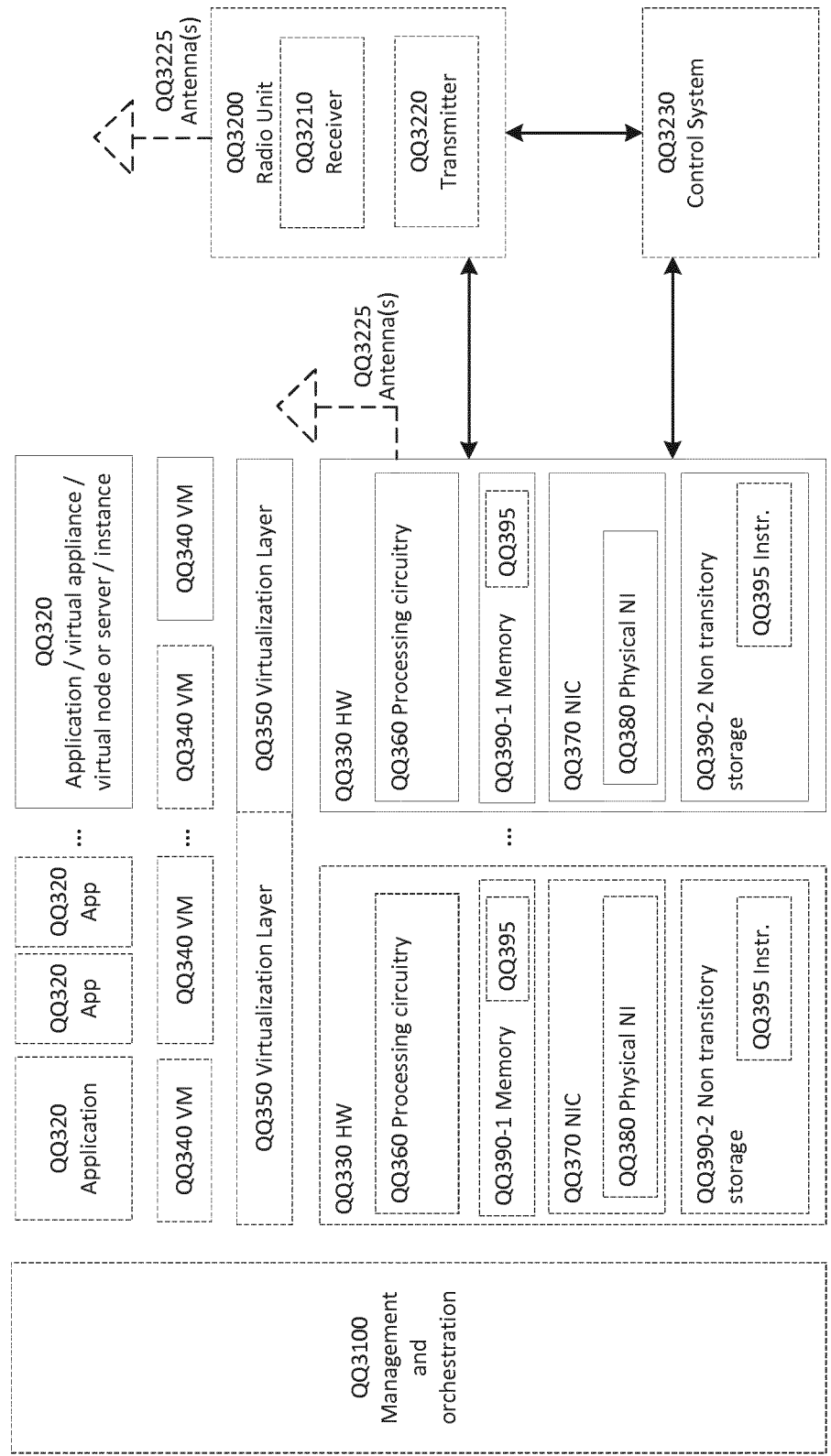
FIG. 12 is a block diagram of a virtualization environment in accordance with some embodiments.

FIG. 12: Virtualization environment in accordance with some embodiments

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 13:
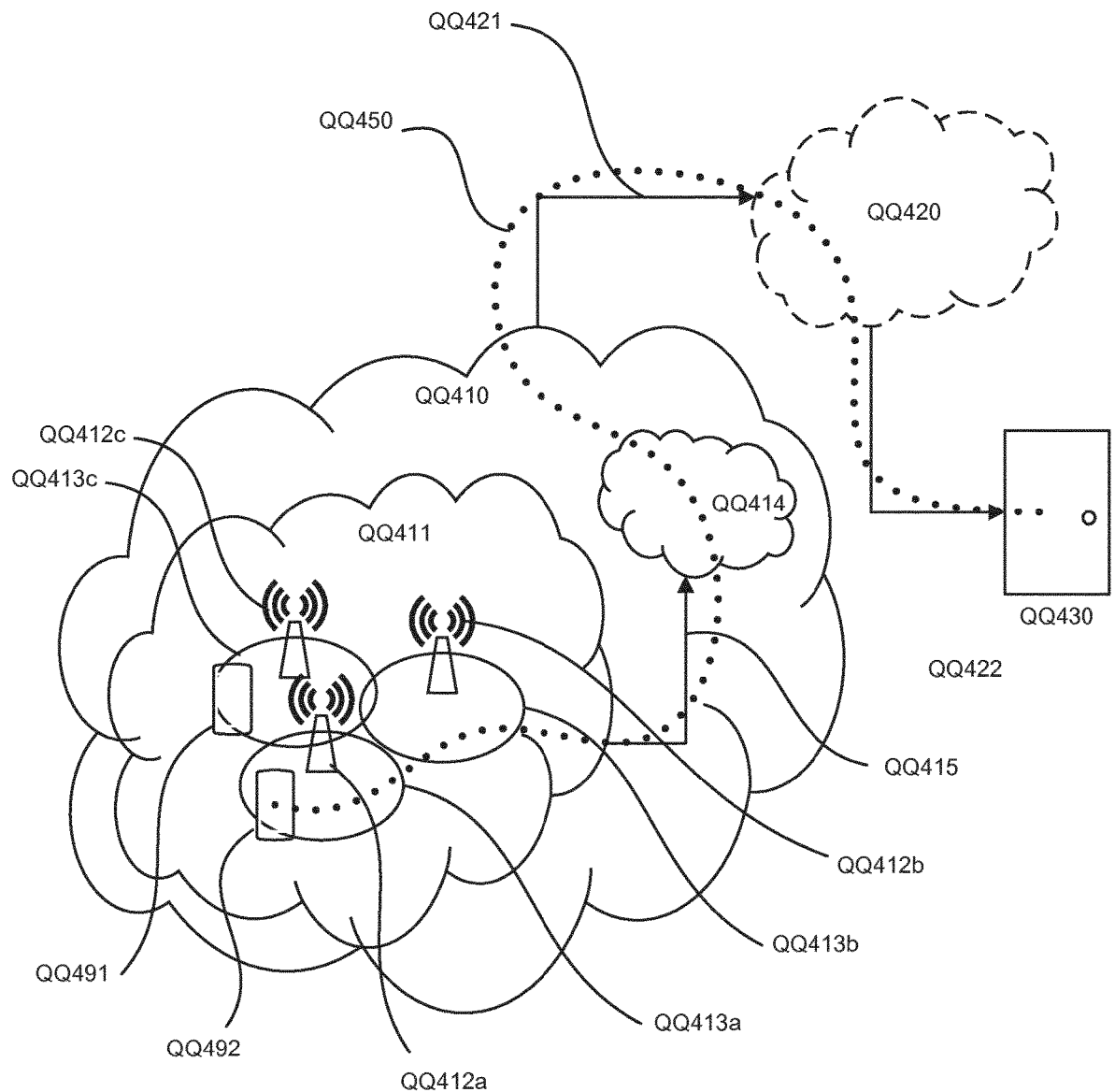
FIG. 13 is a block diagram of a telecommunication network connected via an intermediate network to a host computer in accordance with some embodiments.

FIG. 13: Telecommunication network connected via an intermediate network to a host computer in accordance with some embodiments.

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 14:
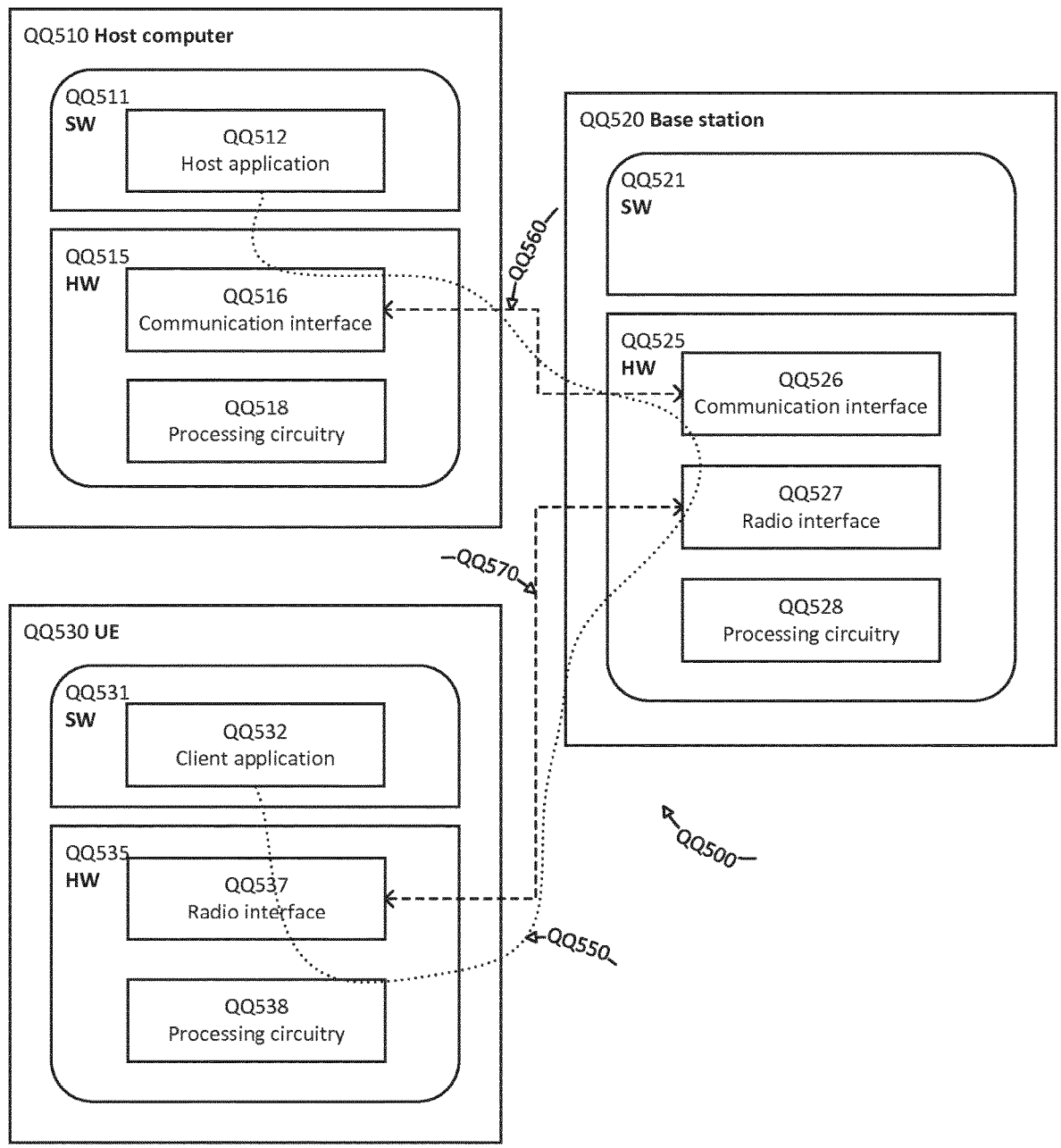
FIG. 14 is a block diagram of a host computer communicating via a base station with a user equipment over a partially wireless connection in accordance with some embodiments.

FIG. 14: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
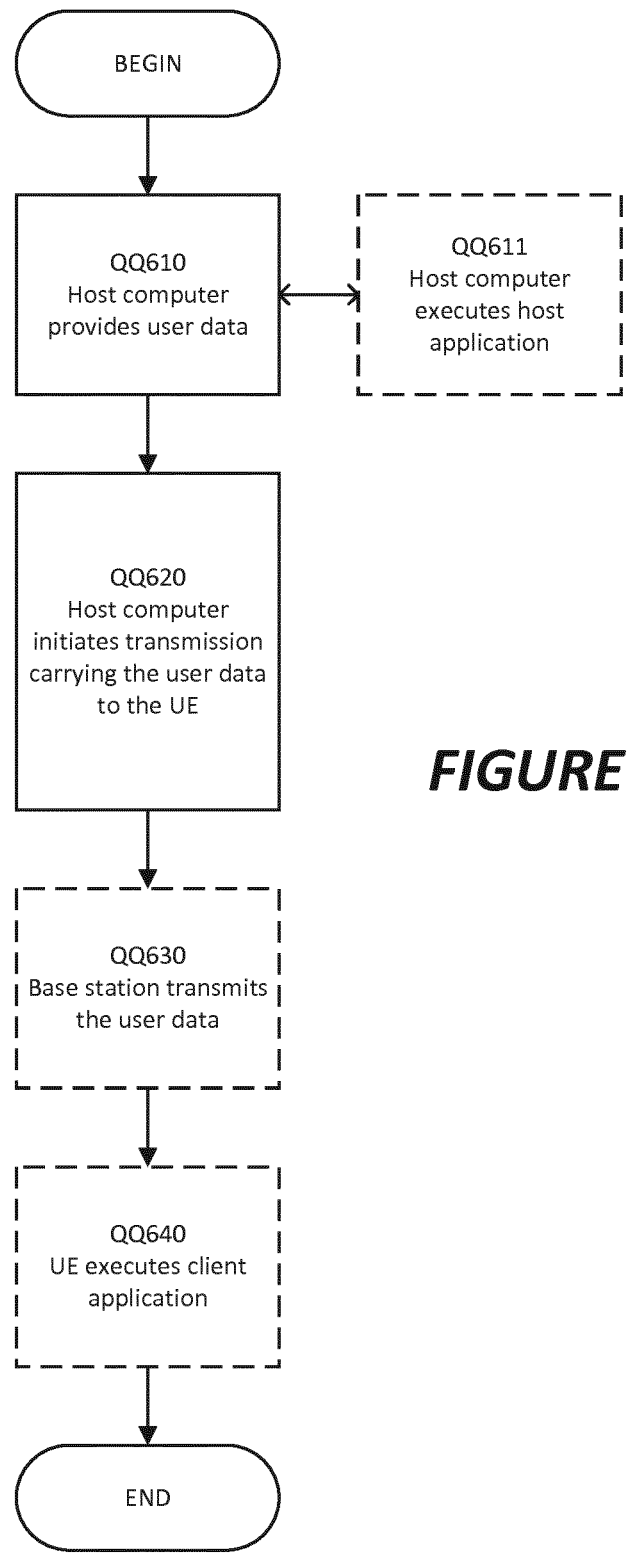
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
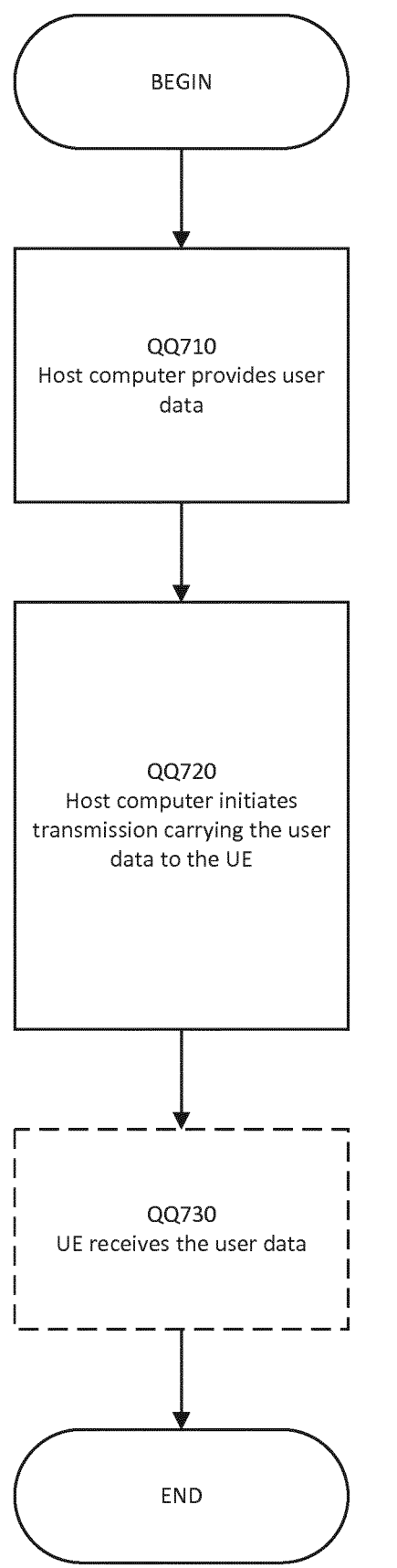
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
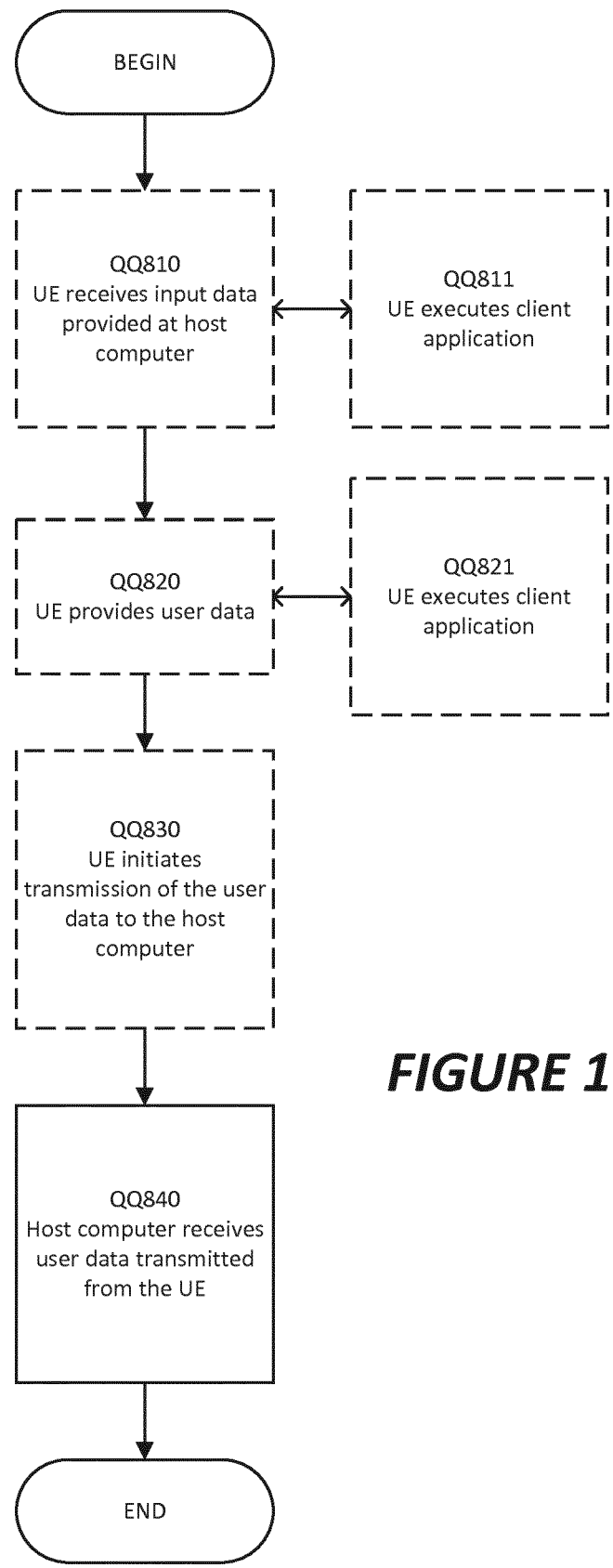
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
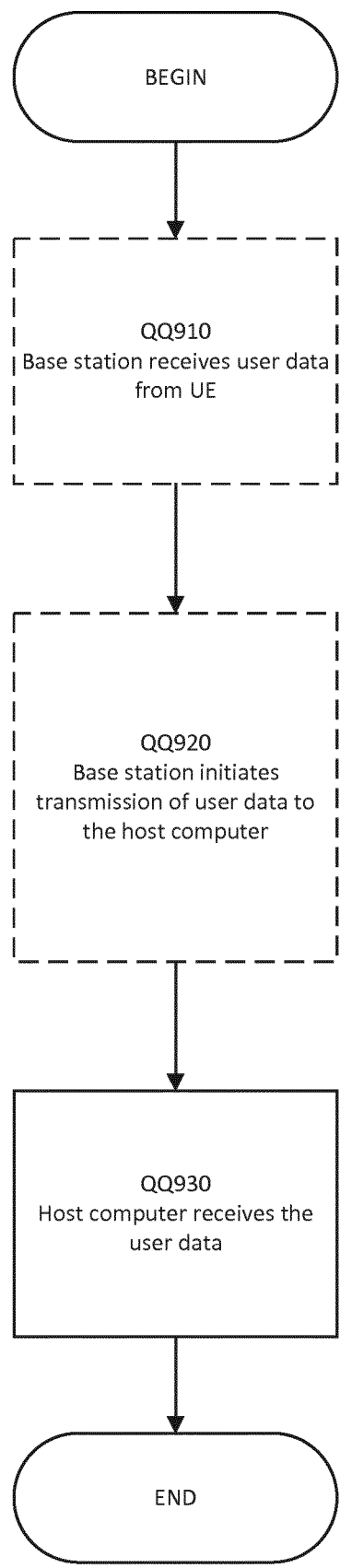
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation.

The invention claimed is:

1. A method in a first wireless device having a plurality of protocol layers including a media access control, MAC, layer and a physical, PHY, layer, the method comprising:
at the MAC layer, selecting a plurality of carriers for carrier aggregation, each of the carriers being associated to a respective hybrid automatic repeat request, HARQ, entity different from a HARQ entity of each other carrier of the plurality of carriers; and
at the MAC layer, initiating a sidelink carrier reselection process by the first wireless device in response to a triggering event, the triggering event comprising at least one of:
there is no configured sidelink grant in any sidelink carrier;
a configured sidelink grant cannot accommodate an RLC SDU by using a maximum allowed modulation and coding scheme, MCS, configured by upper layers for any sidelink carrier with configured SL grant and the MAC entity selects not to segment the RLC SDU; and
transmission(s) with a configured sidelink grant cannot fulfil a latency requirement of data in a sidelink logical channel for any sidelink carrier with a configured sidelink grant, and the MAC selects not to perform transmission(s) corresponding to a single MAC PDU.

2. The method of claim 1, wherein initiating the sidelink carrier reselection process is performed only for the carrier and associated HARQ event associated with the triggering event;
wherein the triggering event comprises at least one of:
for a specific carrier/HARQ entity, if an SL_RESOURCE_RESELECTION_COUNTER=0 and, when the SL_RESOURCE_RESELECTION_COUNTER was equal to 1, the MAC randomly selected, with equal probability, a value in an interval [0, 1] which is above a probability configured by upper layers;
neither transmission nor retransmission has been performed by MAC on any resource indicated in a configured sidelink grant during a previous second for a specific carrier/HARQ entity;
sl-ReselectAfter is configured and a number of consecutive unused transmission opportunities on resources indicated in the configured sidelink grant is equal to sl-ReselectAfter, for a specific carrier/HARQ entity; and/or
a pool of resources is configured or reconfigured by upper layers for a specific carrier.

3. The method of claim 1, wherein initiating the sidelink carrier reselection process is performed for all sidelink carriers configured for sidelink operations;
wherein the triggering event comprises at least one of:
UE capability and/or power limitations are experienced by potential simultaneous transmissions in multiple carriers; and/or
transmissions with a configured sidelink grant are such that the UE is unable to listen/sense the carriers for a long time due to half duplex limitation.

4. The method of claim 1, further comprising:
after initiating the sidelink carrier reselection process, performing at least one of:
continuing to use a previous carrier and performing resource reselection on the previous carrier;
selecting a second sidelink carrier and configuring a second sidelink grant on the second sidelink carrier; and
ceasing to use the sidelink carrier and not selecting any other sidelink carrier.

5. A computer program product comprising a non-transitory storage medium including program code to be executed by processing circuitry of a first wireless device configured to operate in a communication network, whereby execution of the program code causes the first wireless device to perform operations according to claim 1.

6. A first wireless device comprising:
a transceiver configured to provide wireless network communication with a wireless communication network using a plurality of protocol layers including a media access control, MAC, layer; and
a processor coupled with the transceiver, wherein the processor is configured to provide wireless network communication through the transceiver, and wherein the processor is configured to perform operations comprising:
at the MAC layer, selecting a plurality of carriers for carrier aggregation, each of the carriers being associated to a respective hybrid automatic repeat request, HARQ, entity different from a HARQ entity of each other carrier of the plurality of carriers; and
at the MAC layer, initiating a sidelink carrier reselection process by the first communication device in response to a triggering event, the triggering event comprising at least one of:
there is no configured sidelink grant in any sidelink carrier;
a configured sidelink grant cannot accommodate an RLC SDU by using a maximum allowed modulation and coding scheme, MCS, configured by upper layers for any sidelink carrier with configured SL grant and the MAC entity selects not to segment the RLC SDU; and
transmission(s) with a configured sidelink grant cannot fulfil a latency requirement of data in a sidelink logical channel for any sidelink carrier with a configured sidelink grant, and the MAC selects not to perform transmission(s) corresponding to a single MAC PDU.

7. The first wireless device of claim 6, wherein initiating the sidelink carrier reselection process is performed only for the carrier and associated HARQ event associated with the triggering event;
wherein the triggering event comprises at least one of:
for a specific carrier/HARQ entity, if an SL_RESOURCE_RESELECTION_COUNTER=0 and, when the SL_RESOURCE_RESELECTION_COUNTER was equal to 1, the MAC randomly selected, with equal probability, a value in an interval [0, 1] which is above a probability configured by upper layers;
neither transmission nor retransmission has been performed by MAC on any resource indicated in a configured sidelink grant during a previous second for a specific carrier/HARQ entity;
sl-ReselectAfter is configured and a number of consecutive unused transmission opportunities on resources indicated in the configured sidelink grant is equal to sl-ReselectAfter, for a specific carrier/HARQ entity; and/or a pool of resources is configured or reconfigured by upper layers for a specific carrier.

8. The first wireless device of claim 6, wherein initiating the sidelink carrier reselection process is performed for all sidelink carriers configured for sidelink operations;

wherein the triggering event comprises at least one of:

UE capability and/or power limitations are experienced by potential simultaneous transmissions in multiple carriers; and/or transmissions with a configured sidelink grant are such that the UE is unable to listen/sense the carriers for a long time due to half duplex limitation.

9. The first wireless device of claim 6, further comprising:

after initiating the sidelink carrier reselection process, performing at least one of: continuing to use a previous carrier and performing resource reselection on the previous carrier; selecting a second sidelink carrier and configuring a second sidelink grant on the second sidelink carrier; and ceasing to use the sidelink carrier and not selecting any other sidelink carrier.

* * * * *

UNITED STATES PATENT AND TRADEMARK OFFICE
CERTIFICATE OF CORRECTION

| | |
|---|---|
| PATENT NO. | : 11,729,755 B2 |
| APPLICATION NO. | : 17/044944 |
| DATED | : August 15, 2023 |
| INVENTOR(S) | : Belleschi et al. |

It is certified that error appears in the above-identified patent and that said Letters Patent is hereby corrected as shown below:

On the Title Page

On Page 2, in Item (56), under "OTHER PUBLICATIONS", in Column 2, Line 5, delete "Aggregaton" and insert -- Aggregation --, therefor.

On Page 2, in Item (56), under "OTHER PUBLICATIONS", in Column 2, Line 16, delete "V15.1.0" and insert -- v15.1.0 --, therefor.

In the Drawings

In Fig. 10, Sheet 8 of 16, for Tag "QQ172", in Line 1, delete "Tranceiver" and insert -- Transceiver --, therefor.

In Fig. 10, Sheet 8 of 16, for Tag "QQ174", in Lines 1-2, delete "Baseband Circuitry" and insert -- Baseband Processing Circuitry --, therefor.

In Fig. 10, Sheet 8 of 16, delete "QQ170 Wireless Signal" and insert -- Wireless Signal --, therefor.

In Fig. 10, Sheet 8 of 16, for Tag "QQ116", in Line 2, delete "Amplifier(S)" and insert -- Amplifier(s) --, therefor.

In Fig. 10, Sheet 8 of 16, for Tag "QQ118", in Line 1, delete "Filter(S)" and insert -- Filter(s) --, therefor.

In Fig. 10, Sheet 8 of 16, for Tag "QQ122", in Line 2, delete "Tranceiver" and insert -- Transceiver --, therefor.

In Fig. 10, Sheet 8 of 16, for Tag "QQ124", in Lines 1-2, delete "Baseband Circuitry" and insert -- Baseband Processing Circuitry --, therefor.

Signed and Sealed this
Twelfth Day of March, 2024

*Katherine Kelly Vidal*
*Director of the United States Patent and Trademark Office*

CERTIFICATE OF CORRECTION (continued)
U.S. Pat. No. 11,729,755 B2

In Fig. 11, Sheet 9 of 16, for Tag "QQ201", in Line 2, delete "Processor" and insert -- Processing Circuitry --, therefor.

In the Specification

In Column 1, Line 4, delete "CROSS REFERENCE" and insert -- CROSS-REFERENCE --, therefor.

In Column 3, Line 4, delete "embodiments" and insert -- embodiments; --, therefor.

In Column 4, Line 8, delete "processor 03," and insert -- processor 203, --, therefor.

In Column 8, Line 37, delete "TT's" and insert -- TTIs --, therefor.

In Column 11, Line 49, delete "memory 405" and insert -- memory 205 --, therefor.

In Column 11, Line 52, delete "4003, processor 4003" and insert -- 203, processor 203 --, therefor.

In Column 11, Line 54, delete "memory 5005" and insert -- memory 305 --, therefor.

In Column 11, Line 56, delete "processor 5003," and insert -- processor 303, --, therefor.

In Column 11, Line 57, delete "processor 4003" and insert -- processor 303 --, therefor.

In Column 16, Line 62, delete "(4001)" and insert -- (201) --, therefor.

In Column 16, Line 65, delete "(4003)" and insert -- (203) --, therefor.

In Column 17, Line 8, delete "(5001)" and insert -- (301) --, therefor.

In Column 17, Line 10, delete "(5003)" and insert -- (303) --, therefor.

In Column 17, Line 43, delete "(4001)" and insert -- (201) --, therefor.

In Column 17, Line 46, delete "(4003)" and insert -- (203) --, therefor.

In Column 17, Line 56, delete "(5001)" and insert -- (301) --, therefor.

In Column 17, Line 58, delete "(5003)" and insert -- (303) --, therefor.

In Column 18, Line 15, delete "Serives" and insert -- Services --, therefor.

In Column 24, Lines 43-44, delete "radio front end circuitry QQ190" and insert -- radio front end circuitry QQ192 --, therefor.

In Column 25, Line 61, delete "(CPE)." and insert -- (CPE), --, therefor.

CERTIFICATE OF CORRECTION (continued)
U.S. Pat. No. 11,729,755 B2

In Column 26, Line 8, delete "narrow band" and insert -- narrowband --, therefor.

In Column 26, Line 12, delete "etc.) personal" and insert -- etc.), personal --, therefor.

In Column 26, Line 49, delete "Radio front end circuitry QQ114" and insert -- Radio front end circuitry QQ112 --, therefor.

In Column 28, Line 42, delete "proximity or" and insert -- proximity sensor or --, therefor.

In Column 29, Line 20, delete "embodiments" and insert -- embodiments. --, therefor.

In Column 29, Line 32, delete "UE QQ2200" and insert -- UE QQ200 --, therefor.

In Column 29, Line 41, delete "interchangeable." and insert -- interchangeably. --, therefor.

In Column 29, Line 50, delete "power source QQ233," and insert -- power source QQ213, --, therefor.

In Column 31, Line 9, delete "data file QQ227." and insert -- data QQ227. --, therefor.

In Column 31, Lines 17-18, delete "high-density digital versatile disc (HD-DVD)" and insert -- high-definition digital versatile disc (HD-DVD) --, therefor.

In Column 31, Line 46, delete "IEEE 802.QQ2" and insert -- IEEE 802.11 --, therefor.

In Column 32, Line 30, delete "embodiments" and insert -- embodiments. --, therefor.

In Column 32, Line 63, delete "memory QQ390. Memory QQ390" and insert -- memory QQ390-1. Memory QQ390-1 --, therefor.

In Column 33, Line 50, delete "onto" and insert -- into --, therefor.

In Column 38, Line 4, delete "substep" and insert -- step --, therefor.

In Column 38, Line 48, delete "according one" and insert -- according to one --, therefor.